US010152479B1

(12) United States Patent
Granström et al.

(10) Patent No.: US 10,152,479 B1
(45) Date of Patent: Dec. 11, 2018

(54) SELECTING REPRESENTATIVE MEDIA ITEMS BASED ON MATCH INFORMATION

(71) Applicant: Google Inc., Mountain View, CA (US)

(72) Inventors: Johan Georg Granström, Kilchberg (CH); Vladimir Rychev, Kilchberg (CH)

(73) Assignee: GOOGLE LLC, Mountain View, CA (US)

(*) Notice: Subject to any disclaimer, the term of this patent is extended or adjusted under 35 U.S.C. 154(b) by 1103 days.

(21) Appl. No.: 14/449,814

(22) Filed: Aug. 1, 2014

(51) Int. Cl.
*G06F 17/30* (2006.01)

(52) U.S. Cl.
CPC .............. *G06F 17/30038* (2013.01)

(58) Field of Classification Search
None
See application file for complete search history.

(56) References Cited

U.S. PATENT DOCUMENTS

2007/0250901 A1\* 10/2007 McIntire ............ H04N 7/17318
725/146
2014/0164373 A1\* 6/2014 Belyaev ............ G06F 17/30038
707/736

\* cited by examiner

*Primary Examiner* — Amresh Singh
(74) *Attorney, Agent, or Firm* — Young Basile Hanlon & MacFarlane, P.C.

(57) ABSTRACT

Systems and methods for identifying representative media items are provided herein. In particular, users can upload media items to a system. The media items can be matched to reference media items. Candidate representative media items can be selected from matching media items. Representative media items can be selected, from the candidate representative media items, to represent partially matching media items.

20 Claims, 15 Drawing Sheets

SELECTING REPRESENTATIVE MEDIA ITEMS BASED ON MATCH INFORMATION

TECHNICAL FIELD

This disclosure generally relates to identifying duplicate or partial duplicate media items, and, more specifically, to selecting representative media items for a set of related media items.

BACKGROUND

The proliferation of available media items is increasing at exponential levels. Many millions if not billions of items of such viewable media content may be available. Web sites for sharing of digital media items, such as digital music and video files, have become commonplace. The websites may be accessed to upload music and video files, and to find music and video files to download, listen to, or view, as authorized.

With the growth of available media items, it is inevitable that duplicate media items or duplicate portions of media items are uploaded to websites. Media items can have several duplicate media items or partially duplicate media items that include at least some portion of the media item. Users can search such websites for a media item through key word searches or the like. Searching for a media item can result in finding multiple media items that are duplicates or near duplicates of each other.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its purpose is to present some concepts of the specification in a simplified form as a prelude to the more detailed description that is presented in this disclosure.

Systems disclosed herein relate to identifying representative media items for one or more sets of media items. A search query can be received by a media item sharing system. Results to the search query can be generated. Matching media items comprised in the results can be identified, such as based on fingerprint matching, cluster identifications (IDs) and the like. Representative media items can be identified for media items in the search query results. The representative media items can replace duplicate or partially duplicate media items in the search query results.

Other embodiments relate to methods for identifying representative media items and de-duplicating results to a search query. A user can provide a search term to query a media system. Resulting media items can be compared to determine whether representative media items exist. Representative media items can be media items that are capable, according to a criterion, of representing a set of other media items. The set of other media items can be removed from a search result and the representative media items can be returned within the search result.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, embodiments, objects and advantages of the present disclosure will be apparent upon consideration of the following detailed description, taken in conjunction with the accompanying drawings, in which like reference characters refer to like parts throughout, and in which.

DETAILED DESCRIPTION

Figure 1:
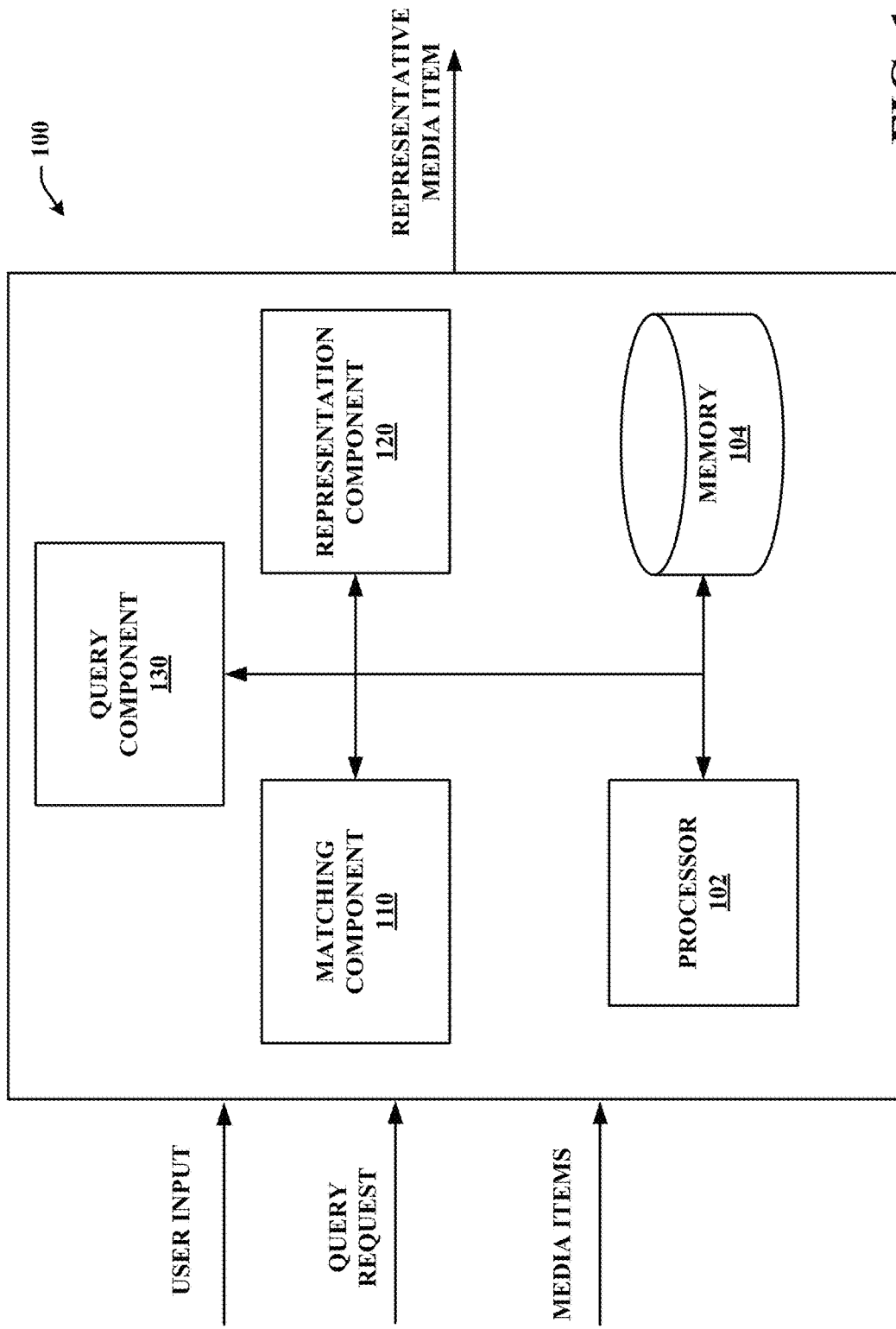
FIG. 1 illustrates a high-level block diagram of an example system that can select representative media items for a set of media items in accordance with certain embodiments of this disclosure.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing this disclosure.

In situations in which the systems discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personal information is removed. For example, a user's identity may be treated so that no personal information can be determined for the user, or a user's geographic location may be generalized where location information is obtained (such as to a city, ZIP code, or state level), so that a particular location of a user cannot be determined. Thus, the user may have control over how information is collected about the user and used by a content server. Moreover, one or more implementations described herein can provide for anonymizing collected, received, or transmitted data.

Terms such as "user equipment," "user equipment device," "mobile device," "user device," "handset," or terms representing similar terminology can refer to a device utilized by a subscriber or user to receive data, convey data, control, voice, video, sound, models, gaming, and the like. The foregoing terms are utilized interchangeably herein and with reference to the related drawings.

Furthermore, the terms "user," "subscriber," "customer," "consumer," "end user," and the like are employed interchangeably throughout, unless context warrants particular distinctions among the terms. It should be appreciated that such terms can refer to human entities, human entities represented by user accounts, or automated components supported through artificial intelligence (e.g., a capacity to make inference based on complex mathematical formalisms), which can provide simulated vision, sound recognition and so forth.

As used herein, terms such as "media content," "media item," "media upload," and the like are employed interchangeably throughout, unless context warrants particular distinctions among the terms. It should be appreciated that such terms can refer to video items, audio items, combinations of video and audio, textual items, images, or other performable media items. It is noted that embodiments describing a video, a video item, an audio item, or the like are not limited to a certain type of media item, and such embodiments can utilize any media item in accordance with various aspects of this disclosure.

In accordance with one or more implementations described in this disclosure, a system, such as a media item sharing system, can determine whether one or more media items are available to represent a set of media items. In some embodiments, once a media item is identified, based on a criterion, for representing the set of media items, the media item can be designated as a representative media item for the set of media items. The representative media item can be a media item that meets a threshold associated with a matching metric (e.g., such as an 80% match of all media items that it will represent).

A matching component can match a media item with reference media items. Reference media items can be comprised within a media store, such as a media item database. The matching component can determine matches based on a comparison of media items to reference media items or based on user input. In one example, a compact descriptor (e.g., fingerprint) can be generated for a media item. The fingerprint can be compared with reference fingerprints associated with reference media items to identify matches or partial matches. Match scores can be generated to describe a level of matching between media items (e.g., percentage match, confidence scores, etc.).

In another aspect, a representation component can select a set of candidate representative media items from a set of media items based on a match threshold defining a level of similarity between media items. The representation component can determine whether candidate representative media items exist and, if they do exist, can select candidate representative media items for each media item in a system. The sets of candidate representative media items can be determined prior to receiving a search query, in response to receiving a search query, or at another time. The set of candidate representative media items can comprise one or more subsets of candidate representative media items, where each subset is associated with a disparate threshold level. For example, a first subset can comprise media items that represent 90% matches and a second subset can comprise media items that represent 80% matches.

A query component can query a system to identify a representative media item for a set of media items based on comparison of the set of media items. In some aspects, the comparison can comprise a comparison of sets of candidate representative media items. In an aspect, given a set of media items (e.g., potential media items for a search result) the representation component can compare respective sets of candidate representative media items and select one or more representatives to represent one or more media items of the set of media items. The query component can present the identified representative media item as a result to a search query. For example, a user can enter a search term in a search box of a media sharing system. The query component can receive the search term and query a system for results. The query component can select representative media items, which can represent matching or partially matching media items, in response to the query. Duplicate media items (e.g., matching or partially matching media items) can be removed for a search result and can be replaced by a representative media item. It is noted that "removing" from a search result may comprise replacing or supplementing a result or potential result. Accordingly, a media item does not necessarily need to be in a set of results before being replaced.

While the various components are illustrated as separate components, it is noted that the various components can be comprised of one or more other components. Further, it is noted that the embodiments can comprise additional components not shown for sake of brevity. Additionally, various aspects described herein may be performed by one device or two or more devices in communication with each other.

Referring now to FIG. 1, a system 100 is depicted. System 100 can select representative media items for a set of media items. Embodiments disclosed herein, for example, can receive a search query and can determine whether there exists a representative media item that can represent, as at least a partial duplicate, a set of other media items. If a representative media item is identified, then the representative media item can be returned as a result for the search query. Such can improve user satisfaction, increase accuracy of search results, increase visibility of media items, decrease duplicate media items in a search result, and provide for a more efficient media content sharing system.

System 100 can include a memory 104 that stores computer executable components and a processor 102 that executes computer executable components stored in the memory 104. It is to be appreciated that system 100 can be used in connection with implementing one or more of the systems or components shown and described in connection with other figures disclosed herein. It is noted that all or some aspects of system 100 can be comprised in larger systems such as servers, computing devices, smart phones, and the like. As depicted, system 100 can include a matching component 110 (which can match media items), a representation component 120 (which can identify candidate representative media items), and a query component 130 (which can receive a query and generate results).

Matching component 110 can utilize matching schemes to identify matching media items. The media items can be stored in a reference database or a memory, such as memory 104. In various embodiments, the matching component 110 can determine matches based on comparison of compact descriptors (e.g., fingerprints) that comprise representations of media items along one or more channels. In an aspect, matching component 110 can determine a fingerprint for a media item (e.g., a received media item) or can receive a fingerprint from a memory store. One method of calculating fingerprints is to first calculate individual interest points that identify unique characteristics of local features of the time-frequency representation of a reference sample. Fingerprints can then be computed as functions of sets of interest points.

Calculating interest points can include identifying unique characteristics of a spectrogram. For example, an interest point can be a spectral peak of a specific frequency over a specific window of time. As another non-limiting example, an interest point can also include timing of the onset of a note. Any suitable unique spectral event over a specific duration of time can constitute an interest point.

In embodiments, matching component 110 can determine media item matches, for example, by analyzing a media or video for unique characteristics that can be used in comparison to unique characteristics among one or more reference media items or fingerprints among a data store. A spectrogram or a window of a spectrogram, for example, can also be used in the comparison of the media item to identify a media sample, in which the spectrogram represents a media sample by plotting time on one axis and frequency or other parameter on another axis.

Storing an entire spectrogram for multiple reference samples may not be efficient and compact descriptors of reference samples can be utilized. The compact descriptors can be utilized to identify near duplicates or nearly identical versions of the same media item. It is noted that there may be multiple correct matches, such as when a media item has multiple duplicate media items or comprises multiple clips from various matching media items. In a media matching system, for example, the system can match the media of a sample, e.g., a user uploaded video/media clip, against a set of references, allowing for a match in any range of the probe sample and a reference sample. Thus, descriptors of the sample are generated based on snapshots (or subsets of correlated sample data—e.g., a spectrogram window) of the sample at different times, which are looked up in an index of corresponding snapshots (or fingerprints) from reference samples. When a sample has multiple matching snapshot pairs, they can be combined during matching to time align the sample and reference sample and generate a consolidated fingerprint.

In some embodiments, matching component 110 can be tuned to match the entirety of a media clip or a portion or percentage match (e.g., 50%, 80%, etc.). For example, a media matching system can be used to determine matches between media items in a reference database of known media items. In yet another example, a media matching system can be used for clustering together multiple media items.

It one or more embodiments, matching component 110 can match media items across one or more channels. The channels can comprise an audio channel, a video channel, or sub-channels of the audio/video. For example, a first video can comprise audio set to a slideshow of a user's personal photographs and a second video can comprise the same audio and a music video. Matching component 110 can determine match scores across the audio channel, across the video channel, and/or across both channels as a weighted score. It is noted that various weighting metrics can be utilized. In one aspect, matching component 110 can determine the videos do not match if both audio and video channels are not matched (e.g., 0% match). In another aspect, matching component can determine the videos have a 50% or other match based on a video matching and an audio not matching. While percentage matches are described herein, it is appreciated that other scoring mechanisms and/or naming conventions can be utilized. For example, match scores can be determined as confidence scores, a tiered scoring system (e.g., high, medium, low, etc.), or the like.

Representation component 120 can assign a number of representative media items to each media item of a set of media items, such that two media items that match will have a non-empty intersection of representatives. In some media matching systems, matching media items are represented by cluster IDs which identify matching media items, such that each cluster comprises a set of matching media items. In systems utilizing cluster IDs, it is not possible to assign cluster IDs to media items in such a way that media items are guaranteed to be assigned the same cluster ID if they have a partial match (e.g., 80% match) and assigned different cluster IDs if they do not have a partial match.

Figure 2:
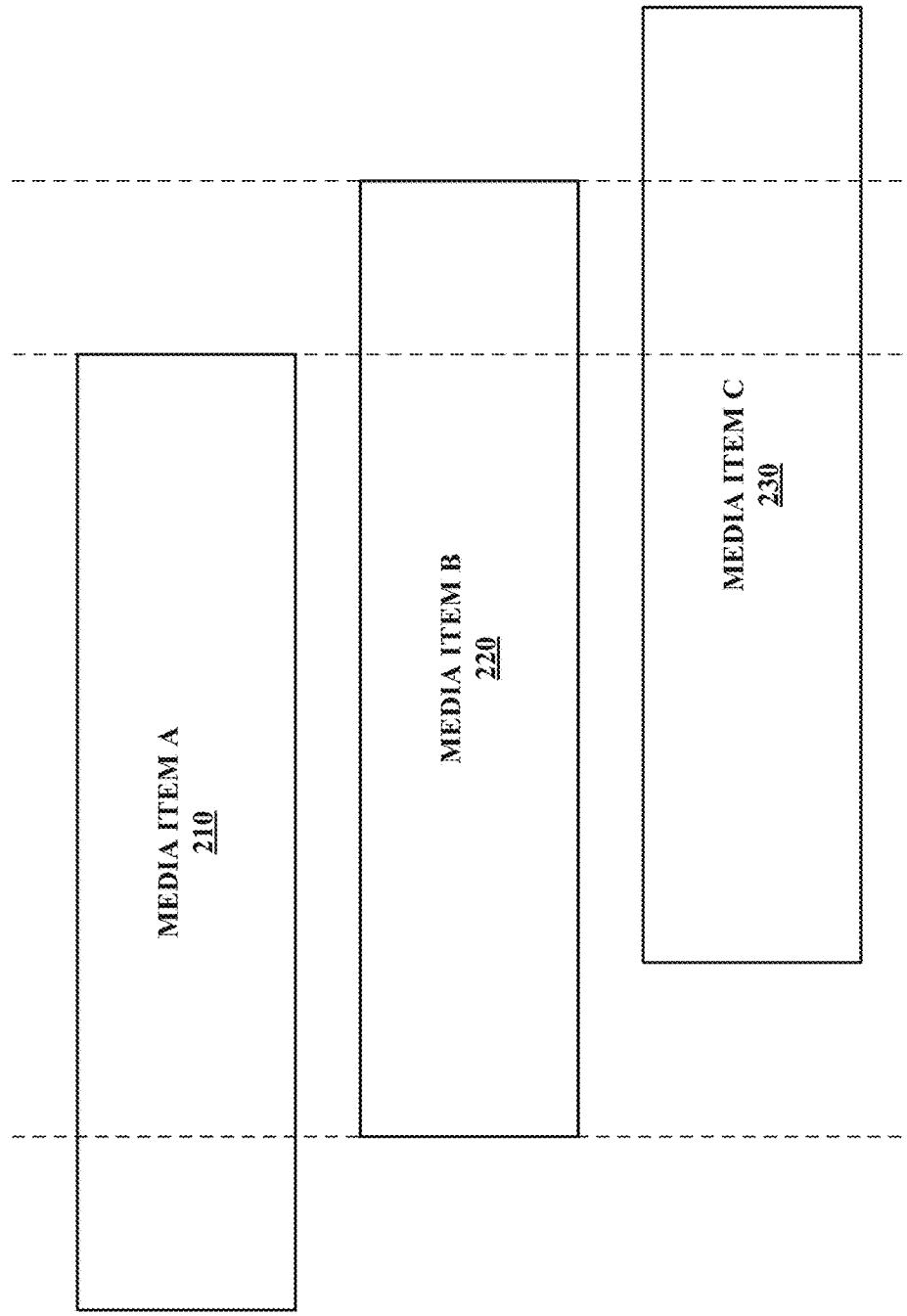
FIG. 2 illustrates a high-level block diagram of an exemplary diagram of three media items that can be identified as partially matching in accordance with certain embodiments of this disclosure.

Referring now to FIG. 2, with reference to FIG. 1, there depicted is an exemplary diagram of three media items that partially match. As depicted, media item A 210 can be a partial match, meeting some threshold level of matching, with media item B 220. Media item B 220 can be a partial match, meeting the threshold level of matching, with media item C 230. However, media item A 210 and media item C 230 may not meet the threshold level of matching. Accordingly, media item A 210 and media item B 220 should have the same cluster ID, while media item B 220 and media item C 230 should have the same cluster ID. However, media item C 230 and media item A 210 must not have the same cluster ID. Thus, no single ID can be assigned to include all three media items. Accordingly, representation component 120 can assign or identify appropriate representative media items (if they exist) to represent media item A 210, media item B 220, and media item C 230.

In one or more embodiments, representation component 120 can identify candidate representative media items for a set of media items. For example, a set of media items matching a media item X with greater than a p % bidirectional match can be represented as $M^p(X)$. Thus, a media item Y is a member of $M^p(X)$ if the length of the match between X and Y is greater than p % of the length of X and p % of the length of Y, where p is a number. The length of the match can represent a sum of the lengths of matching segments of media items X and Y. For example, Y is a member of $M^p(X)$ if the following holds:

$$\text{match\_length} > \frac{p}{100} \times \max(\text{length}(X), \text{length}(Y)).$$

For instance, media item X and media item Y may have a set of matching segments with unmatched segments in between them, such as if media item X is a video of a television show without commercials and media item Y is a video of a television show with commercials. The total length of the matching segments can be determined based on a sum of the lengths of the matching segments in comparison with a total length of the media items.

In some embodiments, media items having an extended length (e.g., a relatively longer length), as defined by a threshold, can be identified as matches where a match threshold is reached (e.g., 80% match) and a length of non-matching segments does not exceed a non-matching threshold (d), such as one minute of non-matching material. For example, a media item Y, that meets a match threshold, is a member of $M^p(X)$ if:

$$d > \max(\text{length}(x), \text{length}(y)) - \text{match\_length}.$$

It is noted that any values of p or d can be utilized herein. Accordingly, any particular value (e.g. 80%, 90%, 99%, etc.) of p is utilized for example only. In another aspect, embodiments describing a p % match or the like can utilize p % matches with at most a non-matching threshold length of d. It is appreciated that embodiments describing a particular value of d (e.g., one minute, 45 seconds, etc.) are utilized as examples only. Likewise d can be measured in any unit of time (e.g., seconds, minutes, hours, etc.) or other metric capable of representing a time period (e.g., frames of a video, etc.). It is noted that other matching metrics can be utilized in addition to or alternatively to a matching percentage. Such other matching metrics can comprise confidence scores, which may be weighted or trained for various aspects.

In an aspect, representation component 120 can identify or generate sets of p % matching media items according to various aspects disclosed herein. In an aspect, representation component 120 can determine a measure of similarity between sets based on a Jaccard similarity or index. The Jaccard similarity is defined as the size of the intersection of the sets divided by the size of the union of the sets. Representation component 120 can utilize the min-hash min-wise independent permutations locality sensitive hashing schemes to determine an estimate of the Jaccard similarity of pairs of sets. In this example, each set can be represented by a constant-sized signature derived from the minimum values of a hash function. The Jaccard similarity of two sets $M^p(X)$ and $M^p(Y)$ can be represented as $J(M^p(X), M^p(Y))$, where:

$$J(M^p(X), M^p(Y)) = \left| \frac{M^p(X) \cap M^p(Y)}{M^p(X) \cup M^p(Y)} \right|$$

If the Jaccard similarity between two sets (e.g., $M^p(X)$ and $M^p(Y)$, is high (e.g., near or about 1), then media items X and Y likely have a long match between them and other videos matching either X or Y may share the same content or portions thereof. It is noted that a Jaccard distance can also be utilized to measure dissimilarity between sets. The Jaccard distance is defined as one minus the Jaccard similarity. For example, a Jaccard distance between two sets $M^p(X)$ and $M^p(Y)$ can be represented as $J_D(M^p(X), M^p(Y))$, where: $J_D(M^p(X), M^p(Y)) = 1 - J(M^p(X), M^p(Y))$. Thus, it is appreciated that embodiments describing a Jaccard similarity can alternatively or additionally utilize a Jaccard distance. In some embodiments, representation component 120 can identify likelihoods of whether sets can be represented by a media item based on a Jaccard similarity between the sets. For example, if the Jaccard similarity is above a threshold, representation component 120 can identify the sets for further processing. It is noted that there is a correlation between the Jaccard similarity among sets and the probability that a representative media item can be identified. Thus, the Jaccard similarity can serve as an empirical observation associated with various embodiments of the subject disclosure.

Figure 3:
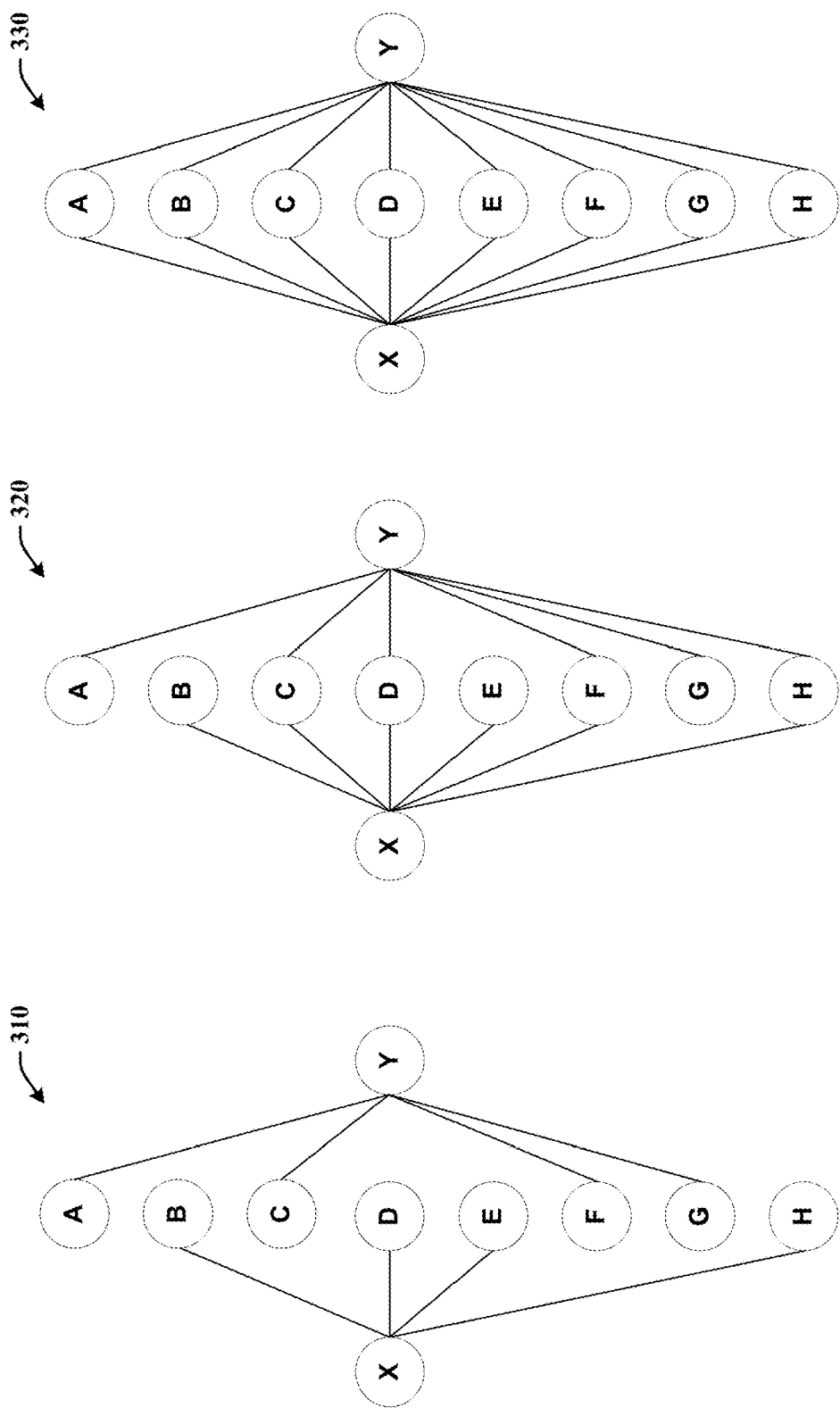
FIG. 3 illustrates exemplary graphs of matching media item sets in accordance with certain embodiments of this disclosure.

Turning to FIG. 3, graphs 310, 320, and 330 are depicted. Each object within the graphs represents a media item or channel of a media item. Edges of the graphs represent matches such that media items belonging to a set of matching media items are connected via edges. As depicted in the graphs, the union of sets $M^p(X)$ and $M^p(Y)$ comprise media items {A, B, C, ... H}. It is noted that if X was a p % match for Y, then X would be a member of $M^p(Y)$. Likewise, if Y was a p % match for X, then Y would be a member of $M^p(X)$. Graph 310 depicts a Jaccard similarity of zero between sets $M^p(X)$ and $M^p(Y)$. It is noted that $M^p(X)$ and $M^p(Y)$ have no matching media items in common. Graph 320 depicts a Jaccard similarity of 0.5 between sets $M^p(X)$ and $M^p(Y)$. In graph 320, sets $M^p(X)$ and $M^p(Y)$ contain some common media items having a p % match. Further, graph 330 depicts Jaccard similarity of 1.0 between sets $M^p(X)$ and $M^p(Y)$, it is noted that all media items of the sets are common.

Referring again to FIG. 1, representation component 120 can store, such as in memory 104, sets of p % matches for a reference media item. In another aspect, it may be impractical or infeasible to store sets of p % matches for each and every video in a media sharing system due to the large amount of media items available on such systems. Accordingly, representation component 120 can generate representative sets of media items that match a reference media item according to a threshold matching metric (e.g., such as a p % match). Representative media items can be selected such that if a reference media item X and a reference media item Y have a common matching media item, the common matching media item can be identified using the a set of representative media items for media item X and a set of representative media items for media item Y. In an example, representation component 120 can be configured to generate candidate representative sets comprising n representatives, where n is a number equal to or less than a total number of matches for a reference media item. In an aspect, a representative set comprising n media items that are greater than a p % match for media item X can be represented as $R_n^p(X)$.

In various embodiments, media items can be represented by media identifications (IDs). As such, references to a media item can refer to a media item ID, a representation of a media item, or the like. For example, a representative set (e.g., $R_n^p(X)$) can comprise a set of media item IDs.

Representation component 120 can select media items, from a set of matching media items, for a representative set at random, semi-randomly, or according to a determined pattern. In at least one example, representation component 120 can apply a hash function to media item IDs and can select the media item IDs based on results of the hash functions. For instance, representation component 120 can apply a hash function to each media item of a set of p % matching media items and can select the n media items that minimize the hash function (i.e., have the lowest value of a result of the hash function). In some embodiments, representation component 120 can select the n media items that maximize the hash function or the like. Accordingly, embodiments describing a minimum or minimizing the hash function can alternatively or additionally utilize a maximum or maximized hash function. It is noted that embodiments can utilize other methods or techniques to select the representative media items.

In an example, let h be an arbitrary hash function or other function utilized for selection (e.g., a semi-randomization function, a randomization function, etc.). Further, let $M^p(X)$ be a set of q media items, where q is a number, (represented as media item IDs) that match media items X, with at least a p % match. Thus, the set of matching videos can be represented as $M'(X)=\{V_1, \ldots, V_q\}$. Then the set of representatives $R_n^p(X)$, can be defined as:

$$R_n^p(X)=\{V_1, \ldots, V_n | h(V_1), \ldots, h(V_n) \text{min for } V \text{ in } M^p(X)\}$$

For instance, with reference to FIG. 3, graph 320 depicts reference media item X and reference media item Y having a set of matching media items. Assume a hash function results in $h(A)<h(B)<h(C)<\ldots<h(H)$. Thus, $R_3^p(X)=\{B, C, D\}$ and $R_3^p(Y)=\{A, C, D\}$. As can be seen in the above example, comparison of the representative media items shows that media items C and D are in both representative sets. In an aspect, if $M^p(X)$ and $M^p(Y)$ have a non-empty intersection (e.g., at least one media item common to both sets), then the probability of $R_n^p(X)$ and $R_n^p(Y)$ having a non-empty intersection is at least $1-(1-J(M^p(X),M^p(Y)))^n$.

For example, if $J(M^p(X), M^p(Y))=0.5$, then the probability of a common element between $R_5^p(X)$ and $R_5^p(Y)$ is $1-(1-0.5)^5=96.875\%$. In another example, if $J(M^p(X),M^p(Y))=0.9$, then the probability of a common element between $R_n^p(X)$ and $R_n^p(Y)$ is $1-(1-0.9)^5=99.999\%$.

In one or more embodiments, representation component 120 can generate subsets of a representative set, such that subsets have different levels of matching (e.g., according to a metric) with a reference media item, have more or less media items, utilize different methods of selection (e.g., different hash functions), and the like. For example, representation component 120 can generate subsets of a representative set based on selecting defined numbers of reference media items having disparate levels of a matching metric. For instance, a first subset can comprise a first number of reference media items at a first level of matching (e.g., 99% match), a second subset can comprise a second number of reference media items at a second level of matching (e.g., 95% match), and a third subset can comprise a third number of reference media items at a third level of matching (e.g., 80% match). While three subsets are described, a different number of subsets can be utilized. Further, any number of media items can be chosen for each subset and any matching metric can be utilized. In an example, three subsets can be respectively defined as $R_2^{99}(X)$, $R_3^{95}(X)$, $R_5^{80}(X)$. It is further noted that different hash functions (or selection processes) can be utilized for the subsets. In an aspect differentiating the hash functions may result in an increased probability of two candidate sets having a media item in common.

Subsets can comprise media items in a range of matching metrics. For example, the first subset can comprise media items having a 99% match or greater, the second subset can comprise media items having a 95% but less than a 99% match, and the third subset can comprise media items having an 80% match but not higher than a 95% match. The subsets need not cover all ranges of possible matches. For instance, a first subset can comprise media items have a 99% match or greater, the second subset can comprise media items having between an 80% match and a 90% match.

It is noted that identifying a set of near exact matches and identifying sets at lower match levels can be beneficial for various embodiments. In some embodiments, a higher recall for near exact matches may be more important, than, for example, having a large number of less exact matches. Selecting representatives based on a tiered level of subsets, as described above, can allow for increasing a probability of identifying near exact matches between two reference media items.

Figure 4:
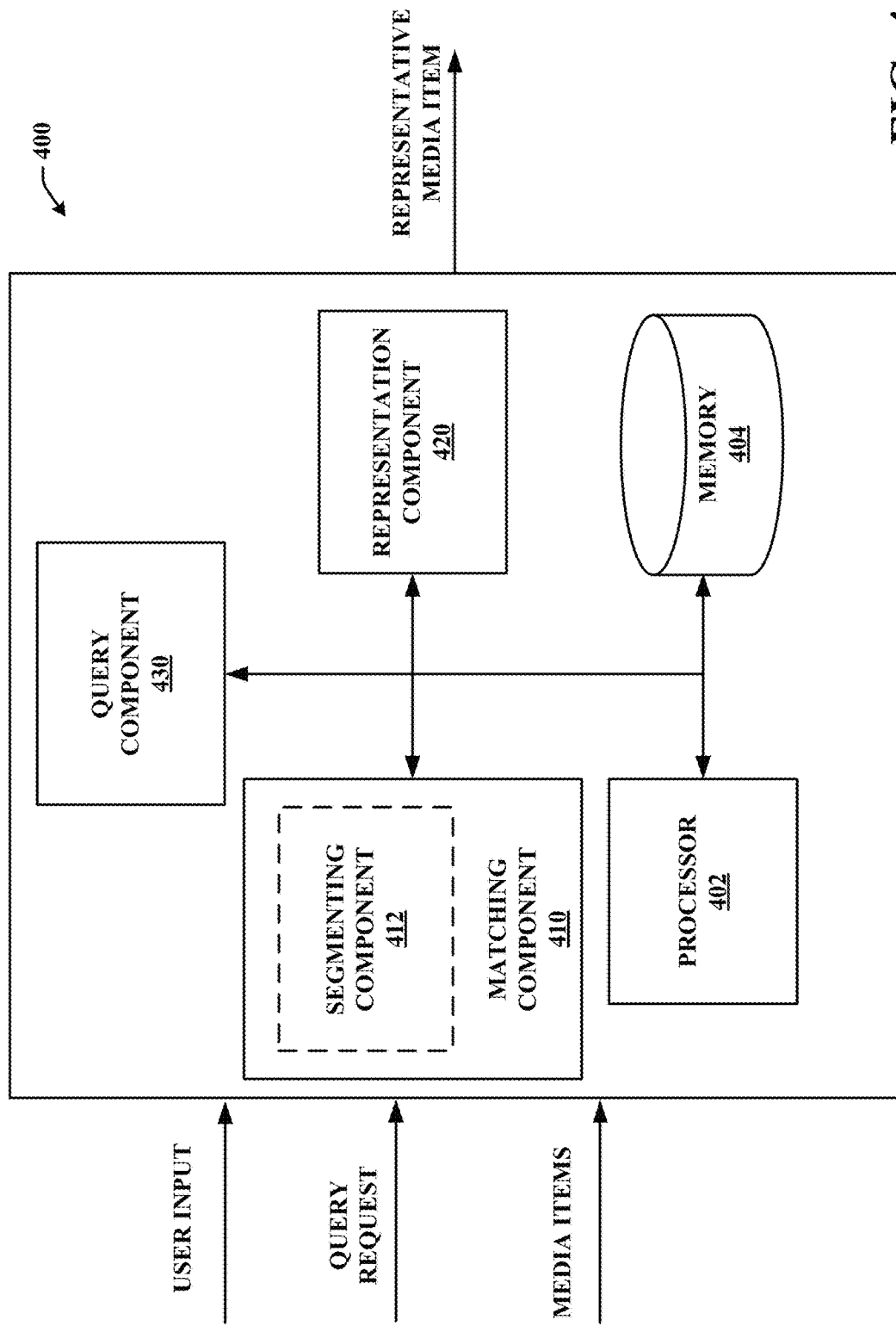
FIG. 4 illustrates a high-level block diagram of an example system that can generate representative sets of media items and can match segments of media items in accordance with certain embodiments of this disclosure.

Referring now to FIG. 4, system 400 is depicted. System 400 can generate representative sets of media items and can match segments of media items in accordance with various embodiments described herein. System 400 can include all or portions of other systems as described previously, or other systems or components detailed herein. It is noted that system 400 can include functionality of various embodiments described with reference to other figures or may include additional functionality.

System 400 can include a memory 404 that stores computer executable components and a processor 402 that executes computer executable components stored in the memory 404. It is to be appreciated that system 400 can be used in connection with implementing one or more of the systems or components shown and described in connection with other figures disclosed herein. It is noted that all or some aspects of system 400 can be comprised in larger systems such as servers, computing devices, smart phones, desktops, laptops, tablets, and the like. As depicted, system 400 can include a matching component 410 (which can match media items), a representation component 420 (which can identify candidate representative media items), and a query component 430 (which can receive a query and generate results). Further, matching component 410 can include a segmenting component 412 (which can facilitate matching segments of media items).

Matching component 410 can compare media items (or representations of media items) to determine a level of matching. As noted herein, matching can be based on content matching, comparison of channels of media items (e.g., audio, video, etc.), comparison of spectrograms, comparison of fingerprints, and the like. In various embodiments, segmenting component 412 can determine matching segments between media items and matching component 410 can determine whether media items match based on the matching segments.

Determining matching segments can comprise determining start times and end times of matching segments. In an aspect, segmenting component 412 can identify segments as matching if the segments are non-overlapping and monotonically increasing in the reference media items. For instance, a first video item can comprise segments of a video program arranged in an original order and a second video item can comprise segments of the video program that have been cut, rearranged, looped, or otherwise edited in disparate order than the original order. For example, the first video can comprise an episode of a video program. The second video can comprise an edited version of the program, that loops or replays a clip that a user may find important. In the above example, segmenting component 412 can be configured such that the first and second video items may not match due to the edited order of segments.

Figure 5:
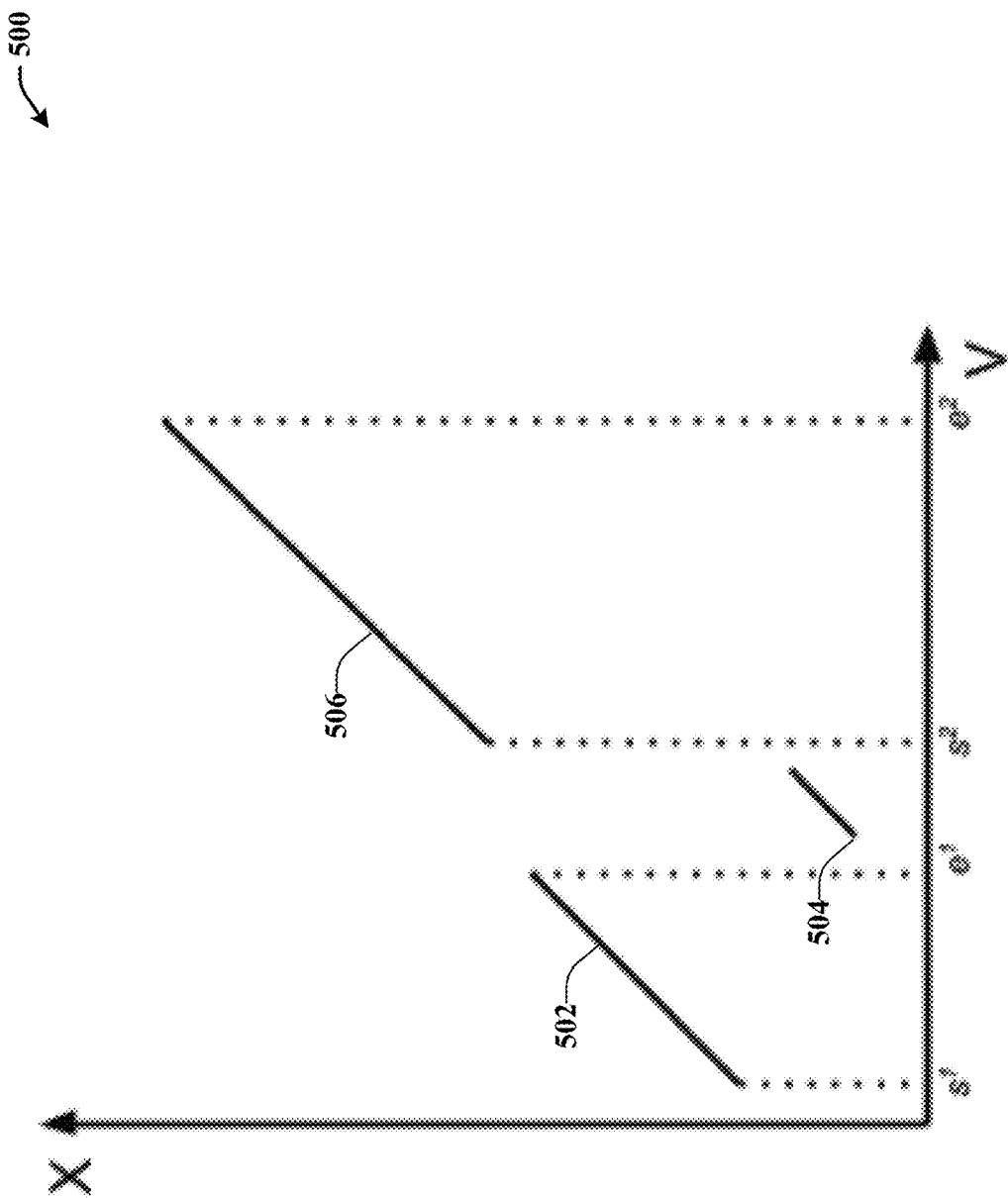
FIG. 5 illustrates an exemplary graph of matching segments of media items in accordance with certain embodiments of this disclosure.

With reference to FIG. 5, graph 500 is depicted. Graph 500 depicts a set of matching segments of media items X and V. As depicted, segments 502, 504, and 506 are represented as solid lines. Segments 502, 504, and 506 represent segments that match portions of media items X and V. Start and end times of the segments can be noted and utilized to determine whether segments are monotonically increasing or non-overlapping. Segments 502 and 506 comprise a sequence of non-overlapping match segments that monotonically increase in both media item X and media item V. In an aspect, segment 504 can represented a segment in media item V that is temporally between segments 502 and 506. In another aspect, segment 504 can also represent a segment that temporally precedes segment 502 in media item X. In some embodiments, segment 504 is not considered as a matching segment and the length of segment 504 is not included in a sum of the lengths of matching segments.

Referring back to FIG. 4, segmenting component 412 can generate a set of segments that match a reference media item. The segments can be represented by start and end times relative to the media item. Matching segments of media items selected as reference media items can be stored or otherwise identified within a set of representative media items. For instance, $L_i$ can represent a list of segments for a media item i from a set of representative media items $R_n^P(X)$, where i is a number, s represents a start time, e represents an end time, and k represents a number of segments, such that $L_i=((s_i^1, e_i^1), \ldots, (s_i^k, e_i^k))$. Thus, a representative set of media items can be defined by pairs of media item ID's (V) and matching segments (L), such that $R_n^P(X)=\{(V_1, L_1), \ldots, (V_n, L_n)|h(V_1), \ldots, h(V_n) \text{min for } V \text{ in } M^P(X)\}$.

In one or more embodiments, segmenting component 412 can identify a longest matching segment for each media item. The longest matching segment can be identified and can be utilized in addition to or as an alternative to an entire set of matching segments. Thus, representation component 420 can store a set of representatives defined by pairs of media item IDs and a start/end time for longest matching segments, such as $$R_n^P(X)=\{(V_1,s_1,e_1), \ldots, (V_n,s_n,e_n)|h(V_1), \ldots, h(V_n) \text{ min for } V \text{ in } M^P(X)\}$$

It is noted that utilizing segments or longest matching segments may lower a recall of some embodiments (i.e., ability to identify representatives for two or more sets of media items). However, media items typically have large continuous matching segments. In other embodiments, media items that do not have large continuous matching segments generally represent media items with small deviations (e.g., advertisements between matching segments). In another aspect, advertisement free versions of such media items can generally be identified in a library of media items. Storing segments or longest matching segments can decrease a size of representative sets and may increase de-duplication speeds, as described below.

In another aspect, representation component 420 can be configured to refine or update representative sets. When a new media item is uploaded or identified, the new media item can be compared to preexisting representative sets. The new media item can replace media items of the preexisting representative sets and a new representative set can be generated to include the new media item. For example, assume that a new video X is added to the corpus, and that we find matches with videos $\{V_1, \ldots, V_q\}$. Assume further that suitable sets of representatives $\{C_1, \ldots, C_q\}$, for the matching sets of each of the videos $\{V_1, \ldots, V_q\}$ are identified. Let C be the union of all these sets of representatives. To construct $R_p^n(X)$ representation component can consider the videos $\{V_1, \ldots, V_q\}$ and all videos from C that have at least a p % bidirectional match with X, and pick n of them with the lowest hash value. This way the set of representatives can be computed, e.g. as $R_2^{99}(X)$, $R_3^{95}(X)$, $R_5^{80}(X)$). Further, whenever h(X) is small enough (e.g., within a minimum n hash values for some subset), X can be inserted into the set of representatives for videos $\{V_1, \ldots, V_q\}$ and matching videos from C. This way of refining the match set of a video X can ensure that the system 400 does not store too many matches, and that the system 400 can bias the matches stored towards matches with small hash values. When a video X is removed from the corpus, the representatives of each video that includes X as a representative can be recomputed. However, in some embodiments, the representative sets may not be updated until occurrence of a defined event that access one or more of the media items of the set, such as a media item being searched for or a new media item being added.

Figure 6:
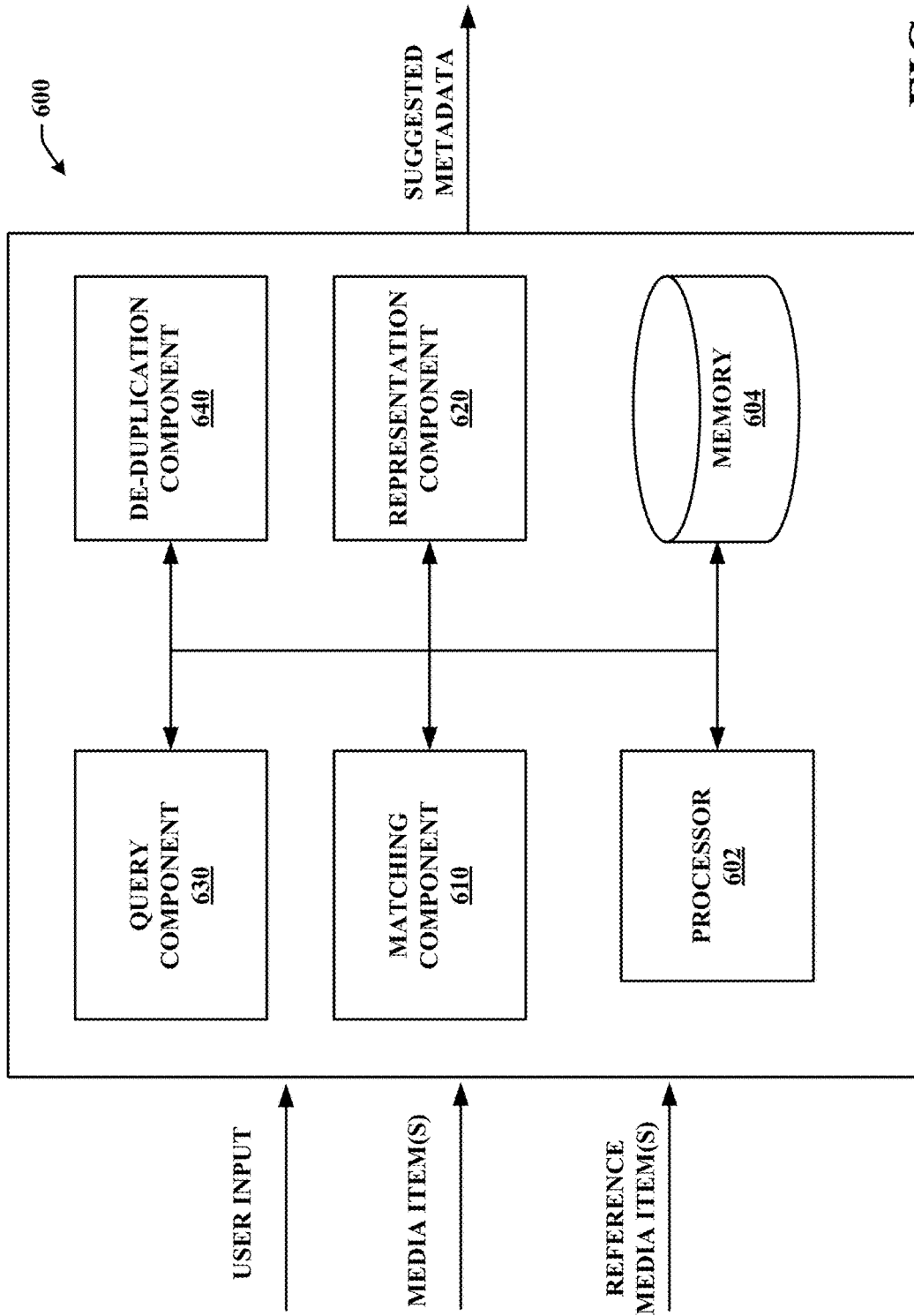
FIG. 6 illustrates a high-level block diagram of an example system that can generate representative sets of media items and can de-duplicate media items in accordance with certain embodiments of this disclosure.

Referring now to FIG. 6, system 600 is depicted. System 600 can generate representative sets of media items and can de-duplicate media items in accordance with various embodiments described herein. System 600 can include all or portions of other systems as described previously, or other systems or components detailed herein. It is noted that system 600 can include functionality of various embodiments described with reference to other figures and may include additional functionality.

System 600 can include a memory 604 that stores computer executable components and a processor 602 that executes computer executable components stored in the memory 604. It is to be appreciated that system 600 can be used in connection with implementing one or more of the systems or components shown and described in connection with other figures disclosed herein. It is noted that all or some aspects of system 600 can be comprised in larger systems such as servers, computing devices, smart phones, and the like. As depicted, system 600 can include a matching component 610 (which can match media items), a representation component 620 (which can identify candidate representative media items), a query component 630 (which can receive a query and generate results), and a de-duplication component 640 (which can de-duplicate results of a search query). It is noted that in some embodiments, de-duplication component 640 can facilitate some or all the functionality, as well as other functionality, described with reference to query components of various of the herein embodiments.

De-duplication component 640 can de-duplicate results or possible results to a search query. For instance, a user can enter criteria for a search of a media item (e.g., such as in a content delivery network). Possible or candidate results can be identified. Duplicates or partial duplicates can be identified within the candidate results. The duplicates or partial duplicates can be represented by one or more appropriate representative media items, such that the one or more representative media items are comprised in a result of the search query. It is noted that a result can comprise a single representative media item per each set or cluster of duplicates or partial duplicates.

Given sets of representative media items for reference items, de-duplication component 640 can determine whether a media item is in common with the representative sets. Determining whether a media item is in common can comprise determining whether a media item is comprised within an intersection of the sets. In another aspect, de-duplication component 640 can determine whether a duration of matching segments of the selected representative meets a defined threshold for the reference media items.

As an example, given two sets of representative media items $C_X = R_2^{99}(X) \cup R_3^{95}(X) \cup R_5^{80}(X) \cup X$ and $C_Y = R_2^{99}(Y) \cup R_3^{95}(Y) \cup R_5^{80}(Y) \cup Y$, de-duplication component 640 can determine whether a media item Z is common to both $C_X$ and $C_Y$. If Z is common in both sets, de-duplication component 640 can determine whether a sum of lengths of media items Z's matching segments, common to both media item X and media item Y, meets a duration threshold. That is, given Z's set of segments that match media item X is $L_Z^X$ and Z's set of segments that match media item Y is $L_Z^Y$, de-duplication component 640 can determine whether the a length of segments in the intersection of the two sets of segments ($L_Z^X \cap L_Z^Y$) meets a defined duration threshold. It is noted that the sets of segments $L_Z^X$ and $L_Z^Y$ can be divided into sub-segments and the sub-segments can be compared to determine matches. In another aspect, the time axis of each set can be intersected to identify common sub-segments. In an example, a segment of $L_Z^X$ can be one hundred units in length. A corresponding segment of $L_Z^Y$ can be ninety-nine units in length. The intersection of such segments can identify that a sub-segment of ninety-nine units in length is matched between $L_Z^X$ and $L_Z^Y$.

In one or more other embodiments, de-duplication component 640 can determine whether the lengths of the intersection of the two sets of segments ($L_Z^X \cap L_Z^Y$) based on a comparison of the longest matching segments in $L_Z^X$ and $L_Z^Y$. For example, representation component 620 can store a list of representative media items for a reference media item as pairs of media items and associated longest segments, as described supra. For instance, (Z, s, e) can belong to $C_X$ and (Z, s', e') can belong to $C_Y$. The duration of the match between media item X and media item Y can be represented as m, where m is defined as m=min (e, e')−max (s,s') if m>p×max(length(X), length(Y)), where p is a desired matching threshold (e.g., 80% match). In one or more embodiments, de-duplication component 640 can determine if the longest segment of Z with respect to media item X (e.g., (Z, s, e)) is a match for the longest segment of Z with respect to media item Y (e.g., (Z, s', e')). It is noted that de-duplication component 640 may not determine if the longest segments match but can simply assume matching.

In another aspect, de-duplication component 640 can determine that a plurality of representative media items can represent the sets $C_X$ and $C_Y$. De-duplication component 640 can select any of the plurality of representatives as the representative for a query result. It is noted that de-duplication component 640 can select the representative based on various criteria, such as quality metrics, author, date of upload/creation, a popularity metric (e.g., number of views, time sensitive popularity metrics, etc.), level of commitment associated with an author (e.g., paying customer), or the like.

Figure 7:
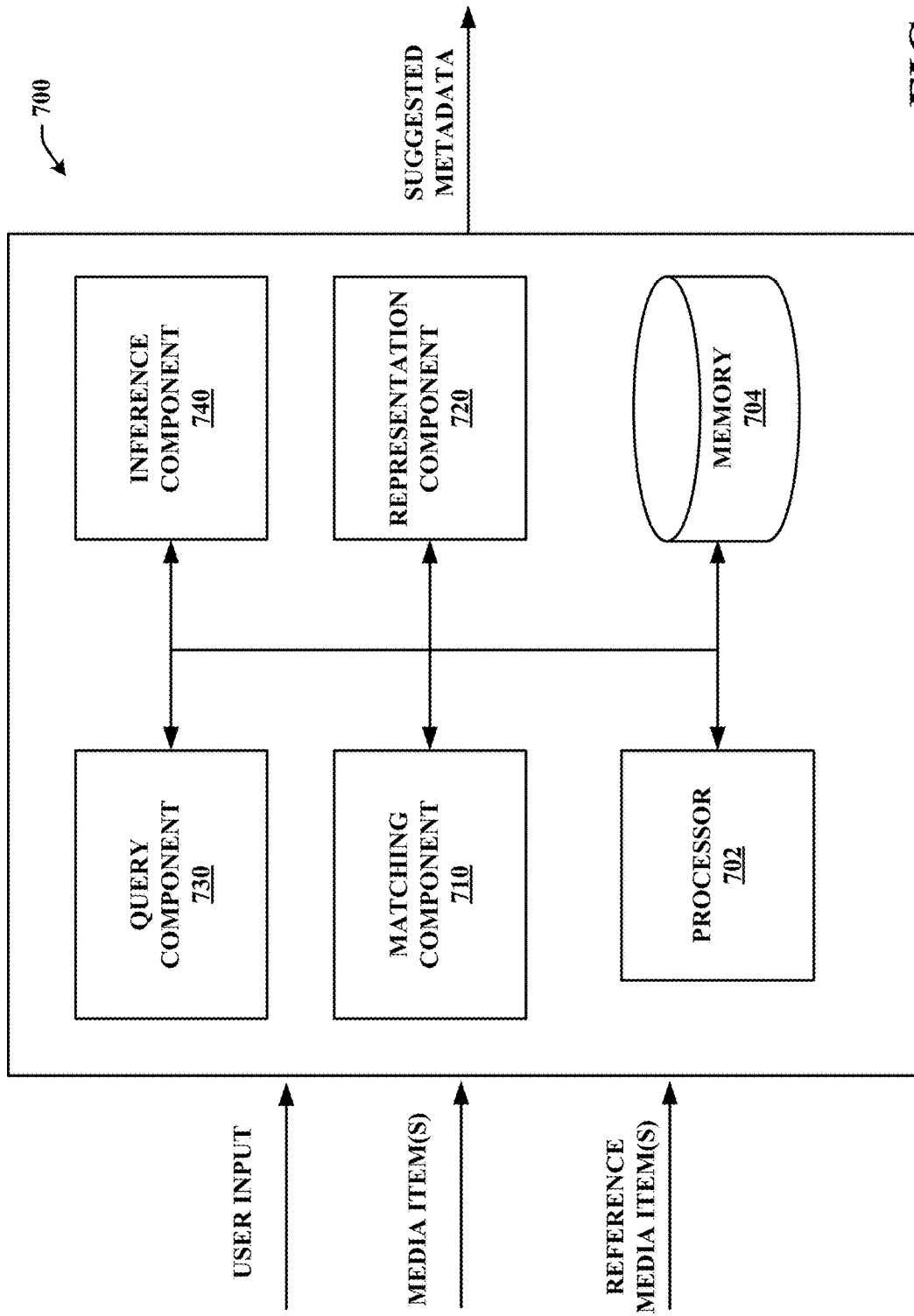
FIG. 7 illustrates a high-level block diagram of an example system that can generate representative sets of media items and can identify representatives for two or more sets in accordance with certain embodiments of this disclosure.

Referring now to FIG. 7, system 700 is depicted. System 700 can generate representative sets of media items and can identify representatives for two or more sets in accordance with various embodiments described herein. System 700 can include all or portions of other systems as described previously, or other systems or components detailed herein. It is noted that system 700 can include functionality of various embodiments described with reference to other figures and may include additional functionality.

System 700 can include a memory 704 that stores computer executable components and a processor 702 that executes computer executable components stored in the memory 702. It is to be appreciated that system 700 can be used in connection with implementing one or more of the systems or components shown and described in connection with other figures disclosed herein. It is noted that all or some aspects of system 700 can be comprised in larger systems such as servers, computing devices, smart phones, and the like. As depicted, system 700 can primarily include a matching component 710 (which can match media items), a representation component 720 (which can identify candidate representative media items), a query component 730 (which can receive a query and generate results), and an inference component 740 (which can facilitate various aspects described herein). It is noted system 700 can include other components described with reference to the figures, but not shown for readability (e.g., de-duplication component 640).

Inference component 740 is configured to provide for or aid in various inferences or determinations associated with aspects of matching component 710, representation component 720, and other components of various embodiments described herein. Moreover, inference component 740 may be granted access to all or portions of other components such as those of systems 100, 400, 600, etc.

In an aspect, inference component 740 can generate inferences associated with media item matching, generate representative sets, and identify representative media items. The inferences can include confidence scores of matches, a number of candidate media items to select for sets (and/or subsets), matching metric thresholds (e.g., p %, confidence scores) for sets or subsets, determining threshold durations for match lengths, and the like. In one aspect, the representation component 720 can determine a number of subsets to generate, as well as a number of media items to select per subset (e.g., n) and matching threshold (e.g., p) based on inferences provided by the inference component 740.

In order to provide for or aid in the numerous inferences described herein, inference component 740 can examine the entirety or a subset of the data to which it is granted access and can provide for reasoning about or infer states of the system, environment, etc. from a set of observations as captured via events and/or data. An inference can be employed to identify a specific context or action, or can generate a probability distribution over states, for example. The inference can be probabilistic—that is, the computation of a probability distribution over states of interest based on a consideration of data and events. An inference can also refer to techniques employed for composing higher-level events from a set of events and/or data.

Such an inference can result in the construction of new events or actions from a set of observed events and/or stored event data, whether or not the events are correlated in close temporal proximity, and whether the events and data come from one or several event and data sources. Various classifications (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, x=(x1, x2, x3, x4, xn), to a confidence that the input belongs to a class, such as by f(x)=confidence(class). Such classification can employ a probabilistic and/or statistical-based analysis (e.g., factoring into the analysis utilities and costs) to infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

It is noted that various embodiments described herein can utilize predetermined values for parameters, such as a number of subsets to generate, as a number of media items to select per subset, a matching threshold (e.g., p), and duration thresholds, and the like. Other embodiments can utilize inferences from inference component 740 to determine values for the parameters. For example, inference component 740 can identify a category associated with a media item, such as a sporting event, and can determine values of parameters based on learned patterns of the like. For instance, certain categories of media items may have a greater number of matches (e.g., audio) and relatively larger matching segments, while other categories of media items, e.g., sports highlights, can have many relatively short matching segments with variations (non-matching segments) in between. In another aspect, certain categories of media items may place a greater importance on an audio channel than on a video channel. Accordingly, matching can be weighted more heavily on the audio channel. Accordingly, inference component 740 can determine inferences and dynamically configure values for parameters to facilitate higher levels of matches and/or improve systems described herein.

Figure 8:
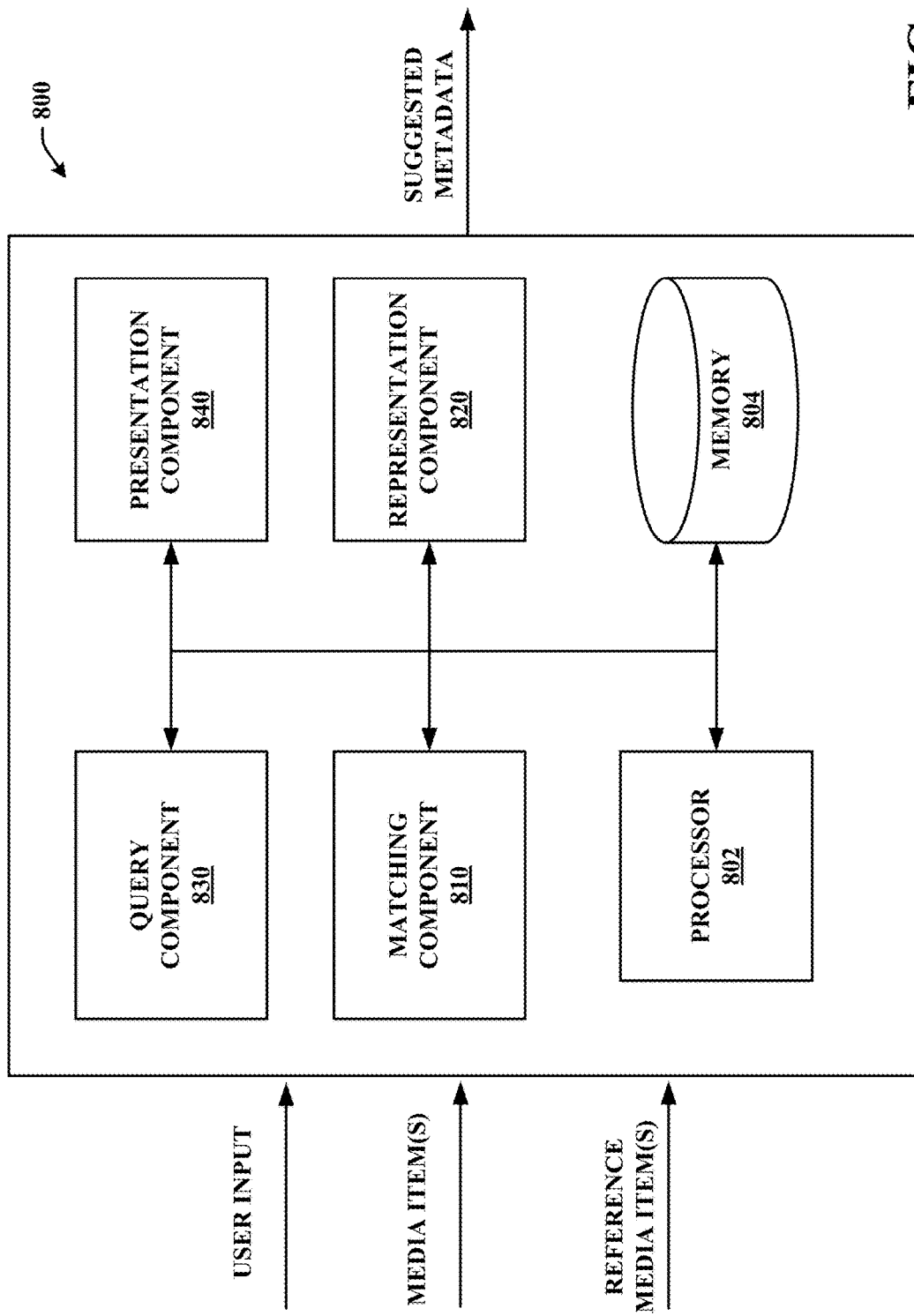
FIG. 8 illustrates a high-level block diagram of an example system that can present de-duplicated query results in accordance with certain embodiments of this disclosure.

Referring now to FIG. 8, system 800 is depicted. System 800 can present de-duplicated query results in accordance with various embodiments described herein. System 800 can include all or portions of other systems as described previously, or other systems or components detailed herein.

System 800 can include a memory 804 that stores computer executable components and a processor 802 that executes computer executable components stored in the memory 804. It is to be appreciated that system 800 can be used in connection with implementing one or more of the systems or components shown and described in connection with other figures disclosed herein. It is noted that all or some aspects of system 800 can be comprised in larger systems such as servers, computing devices, smart phones, and the like. As depicted, system 800 can primarily include a matching component 810 (which can match media items), a representation component 820 (which can identify candidate representative media items), a query component 830 (which can receive a query and generate results), and a presentation component 840 (which can facilitate rendering of query results in accordance with various aspects described herein). It is noted system 800 can include other components described with reference to the figures but not shown for readability (e.g., de-duplication component 640, inference component 740, etc.).

Presentation component 840 can render or facilitate rendering of query results (e.g., de-duplicated query results). In some embodiments, the presentation component 840 can be comprised wholly or partly on a user equipment device. In other embodiments, presentation component 840 can be comprised wholly or partly on a separate device (e.g., such as a server). It is noted that presentation component 840 can comprise an interface capable of receiving input, an interface capable of rendering output, or can instruct an interface to render output. In another aspect, presentation component 840 can initiate a rendering based on instructing a disparate device to display a rendering.

Figure 9:
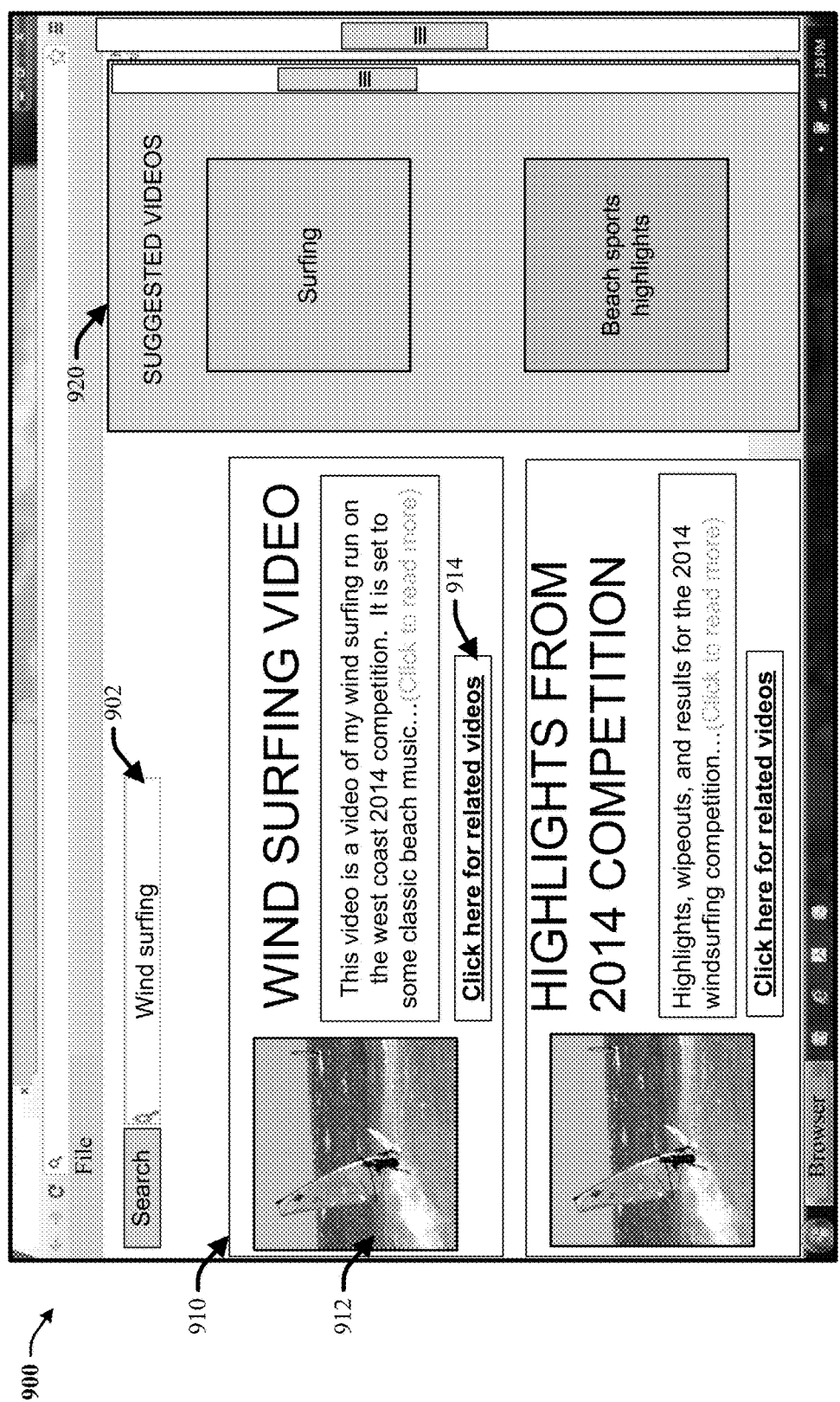
FIG. 9 illustrates a high-level block diagram of an example interface that can facilitate rendering de-duplicated query results in accordance with certain embodiments of this disclosure.
Figure 10:
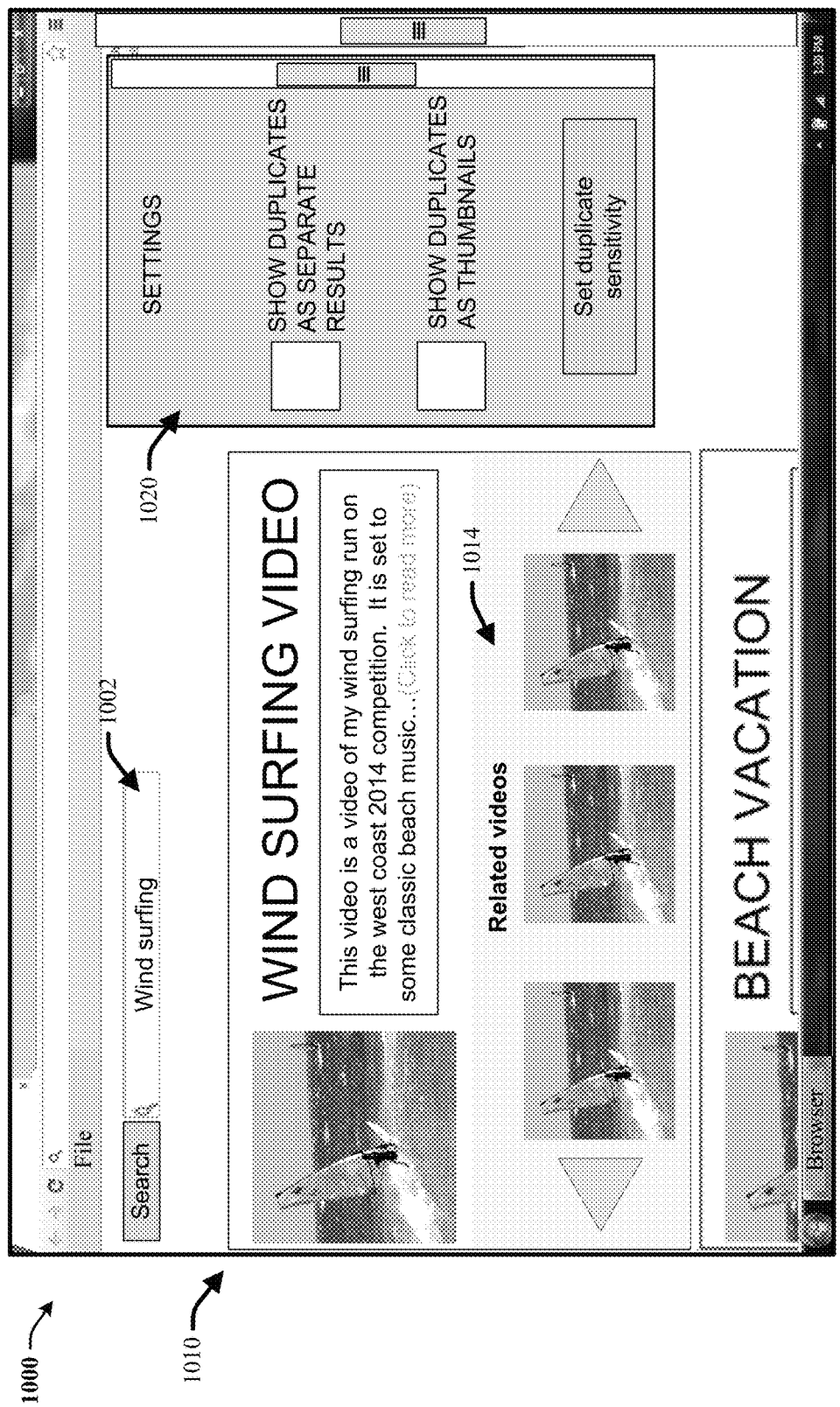
FIG. 10 illustrates a high-level block diagram of an example interface that can facilitate rendering de-duplicated query results and control settings in accordance with certain embodiments of this disclosure.

Turning to FIGS. 9 and 10 with reference to FIG. 8, there illustrated are an exemplary interface 900 and an exemplary interface 1000. Presentation component 840 can render or facilitate rendering of interface 900 and interface 1000. Interface 900 can primarily comprise a query input component 902, a query results area 910, a duplicate displaying control 914, and suggested media items 920. A user can provide input to query input component 902. Query input component 902 can receive input, such as text. Input can be received by query component 830, for example. Query component 830 can generate results for the search query. The results can be de-duplicated as described herein.

Presentation component 840 can facilitate rendering the results in the query results area 910. As depicted, a representative media item 912 can be displayed as a thumbnail image. It is noted that the representative media item 912 can be displayed in a list or via other means. In one or more embodiments, duplicate displaying control 914 can provide a link or means to view media items that are represented by representative media item 912. For example, a user can desire to see duplicates or near duplicates of representative media item 912. The user can click or otherwise select duplicate displaying control 914 to view the duplicates or partial duplicates.

In one or more embodiments, matching component 810 can identify suggested media items for a user. The suggested media items can be displayed, in an area or list of suggested media items 920, as a result of a user selecting a media item for view or in response to a search query. It is noted that the suggested media items can be indentified based on a history associated with a user, preferences associated with a user, or the like. Representation component 820 can identify representative media items for media items within the suggested media items. The representative media items can be displayed in the suggested media items in place of duplicate (or partially duplicate) suggested media items.

Interface 1000 can primarily comprise a query input 1002, query results 1010, a duplicate media items 1014, and de-duplicate controls 1020. As depicted, duplicate media items 1014 can be displayed such that a user can determine that duplicate media items 1014 are duplicates or partial duplicates of a representative media item. It is noted that duplicate media items 1014 can be displayed as a set of smaller, relative to a representative media item, media items. It is further noted, that presentation component 840 can render duplicate media items 1014 in various other formats, such as in a list, in a separate window, or the like.

De-duplicate controls 1020 can receive user input to alter de-duplication settings. In one or more aspects, de-duplication settings can facilitate selection of parameters utilized to identify, display, or select media items for display and/or as representatives. In an aspect, a user can enter input to determine how or whether duplicates are displayed. In another aspect, a user can enter input to determine sensitivity of duplicate detection. Sensitivity can be altered based on parameters of a system. For example, a high sensitivity can be associated with a high level of matching (e.g., 99%), while a relatively low sensitivity can be associated with a lower level of matching. In embodiments, various components of system 800 can utilize de-duplicate settings to adjust parameter and/or representative sets. It is noted that de-duplicate settings can be stored for each user or groups of users. In another aspect, a user having an elevated level of control (e.g., administrator) can set de-duplicate settings.

While the above example illustrates de-duplicating media items in a media sharing systems, it is noted that media items can be de-duplicated in various other systems. For example, users can capture media items or otherwise generate media items via a computing device and can upload the media item to a system. The system can identify a representative media item for the media upload and/or inform a user of potential duplicates. It is noted that aspects can be presented in a mobile application ("apps") network, a social network, a blogging network, a news service network, or virtually any other network.

Figure 11:
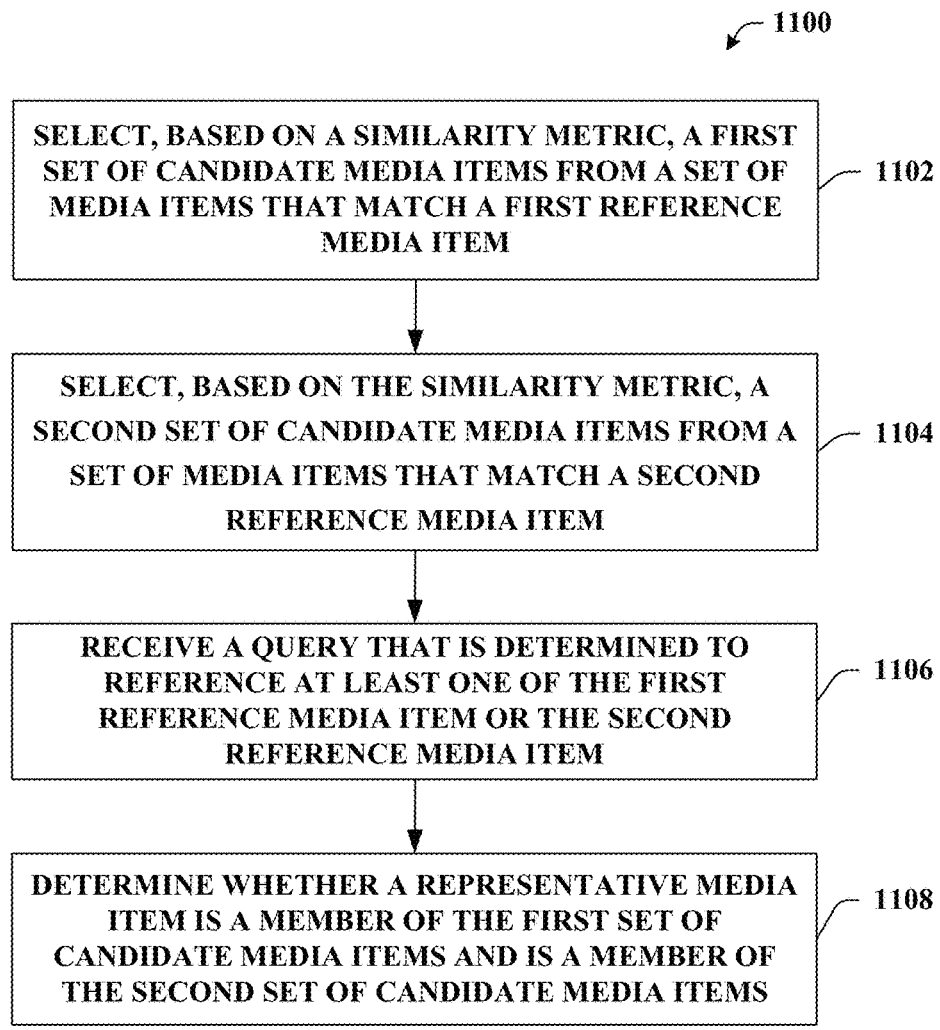
FIG. 11 illustrates an example methodology that can provide for determining whether a media item can represent other media items in accordance with certain embodiments of this disclosure.
Figure 12:
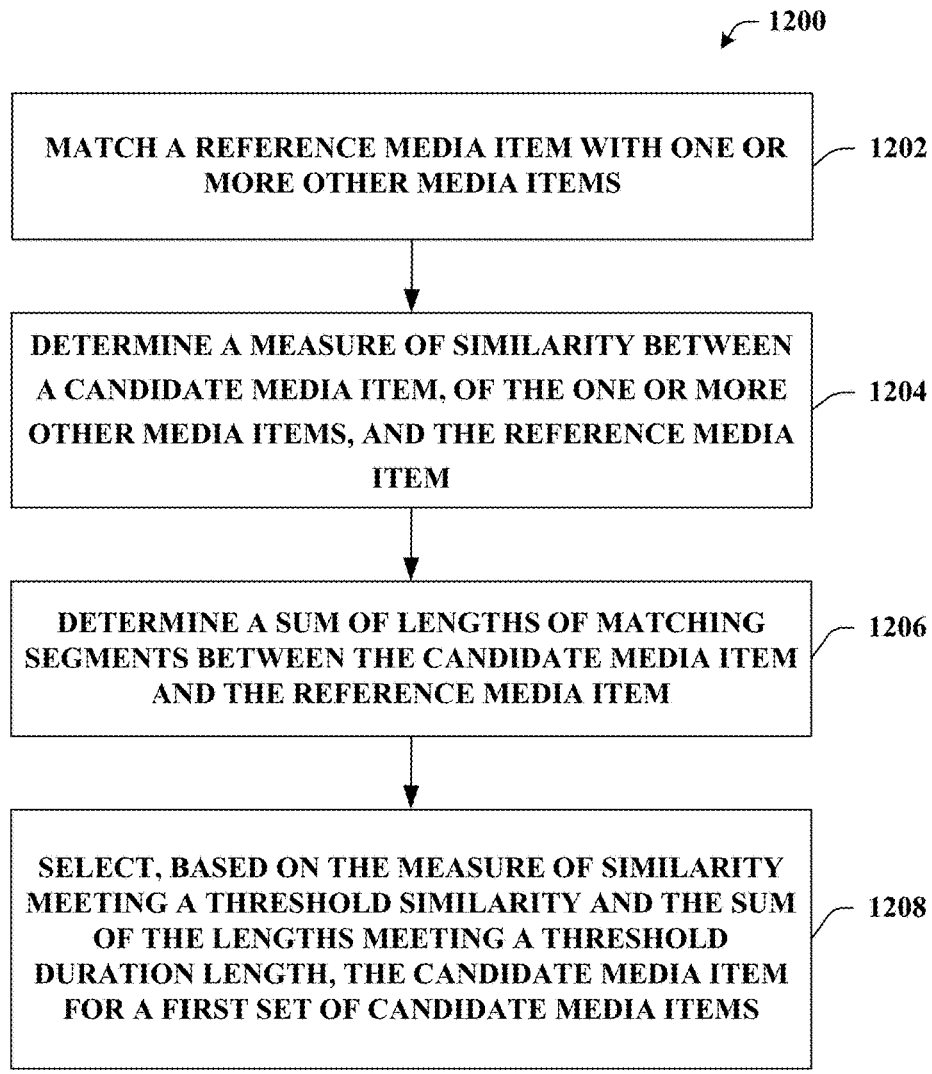
FIG. 12 illustrates an example methodology that can provide for selecting a set of representative media items based in part on a duration threshold in accordance with certain embodiments of this disclosure.
Figure 13:
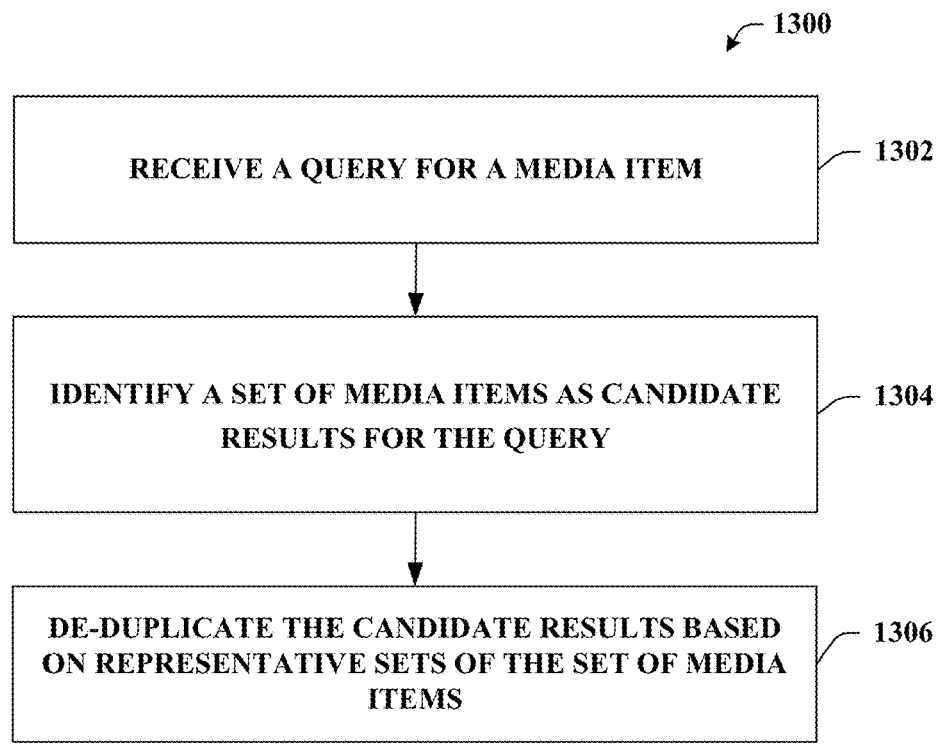
FIG. 13 illustrates an example methodology that can provide for de-duplicating a set of media items in accordance with certain embodiments of this disclosure.

FIGS. 11-13 illustrate various methodologies in accordance with certain embodiments of this disclosure. While, for purposes of simplicity of explanation, the methodologies are shown as a series of acts within the context of various flowcharts, it is to be understood and appreciated that embodiments of the disclosure are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be further appreciated that the methodologies disclosed hereinafter and throughout this disclosure are capable of being stored on an article of manufacture to facilitate transporting and transferring such methodologies to computers. The term article of manufacture, as used herein, is intended to encompass a computer program accessible from any computer-readable device or storage media. It is noted that the methods depicted in FIGS. 11-13 can be performed by various systems disclosed herein, such as systems 100, 400, 600, 700, and 800. In another aspect, FIGS. 11-13 can facilitate rendering of interface 900 and 1000.

FIG. 11 illustrates an exemplary method 1100. Method 1100 can facilitate determining whether a media item can represent other media items. In another aspect, the method 1100 can identify media items that belong to one or more sets of candidate representative media items, each set associated with a disparate media item, wherein the disparate media items may or may not match each other according to a similarity metric.

At reference numeral 1102, a system can select (e.g., via representation component 120), based on a similarity metric, a first set of candidate media items from a set of media items that match a first reference media item. It is noted that the method can select, as the set of candidate representative media items, a first subset of candidate representative media items based on the match threshold and a second subset of candidate representative media items based on a disparate match threshold. It is noted than any number of subsets can be selected. It is further noted that subsets may comprise a common number or a disparate number of media items. In at least one embodiment, if media items cannot be selected for one subset (e.g., no media item meets the first matching threshold) then the number of media items selected for other subsets can be increased.

At 1104, the system can select (e.g., via representation component 120), based on the similarity metric, a second set of candidate media items from a set of media items that match a second reference media item. As noted supra, the second set of candidate media items can comprise subsets of candidate media items. It is noted that the first and second sets of reference media items need not comprise the same number of subsets or utilize similar matching metrics.

At 1106, the system can receive (e.g., via query component 130) a query that is determined to reference at least one of the first reference media item or the second reference media item. The query can reference a media item if the query identifies the media item as a potential result, or otherwise refers to the media item (e.g., media items related to the media item are returned as a result). The query can be based on a search query, a request to identify suggested media items, or the like.

At 1108, the system can determine (e.g., via query component 130) whether a representative media item is a member of the first set of candidate media items and is a member of the second set of candidate media items. For example, the system can identify whether a media item is in an intersection of the two sets. It is noted that the system can utilize a different number of sets and can determine whether any number of media items are comprised in the intersection.

Turning now to FIG. 12, exemplary method 1200 is depicted. Method 1200 can provide for selecting a set of representative media items based in part on a duration threshold. At reference numeral 1202, a system can match (e.g., via matching component 410) a reference media item with one or more other media items. Matching can comprise content matching, matching based on fingerprints, classifiers, or the like.

At reference numeral 1204, a system can determine (e.g., matching component 410) a measure of similarity between a candidate media item, of the one or more other media items, and the reference media item. The level of similarity can comprise a confidence score, a percentage of matching content, or other measurement of similarity as described herein.

At reference numeral 1206, a system can determine (e.g., via segmenting component 412) a sum of lengths of matching segments between the candidate media item and the reference media item. In one or more embodiments, the sum of lengths may be based on non-overlapping and sequential segments.

At reference numeral 1208, a system can select (e.g., via query component 430), based on the measure of similarity meeting a similarity threshold and the sum of the lengths meeting a threshold duration length, the candidate media item for a first set of candidate media items. The set of candidate media items can be stored (e.g., via memory 1204). In an aspect, method 1200 can iterate for some or all media items in a media store.

Turning now to FIG. 13, example method 1300 is illustrated. Method 1300 can provide for de-duplicating a set of media items. For example, the method 1300 can provide for receiving a query, generating candidate results for the query, and de-duplicating the results. At 1302, a system can receive (e.g., via query component 630) a query for a media item. The query can be received, for example, via an interface (e.g., such as interface 900 and/or 1000). In an aspect, the query can be based on user provided search criteria, a request to provide suggested media items, or the like.

At 1304, a system can identify (e.g., via query component 630) a set of media items as candidate results for the query. The candidate results for the query can be identified based on metadata (e.g., tags, titles, classifications) associated with media items, or the like. In an aspect, candidate results can represent a set of results that may comprise duplicate or partially duplicate media items.

At 1306, a system can de-duplicate (e.g., via de-duplication component 640) the candidate results based on representative sets of the set of media items. In an example, de-duplication can comprise removing duplicates or partial duplicates and replacing them with an appropriate representative media item for a result of the query. It is noted that de-duplication can be performed in real time or near-real time. That is, de-duplication can be performed in response to receiving a query request. In one or more other aspects, de-duplication can be predetermined and stored for later use.

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

Figure 14:
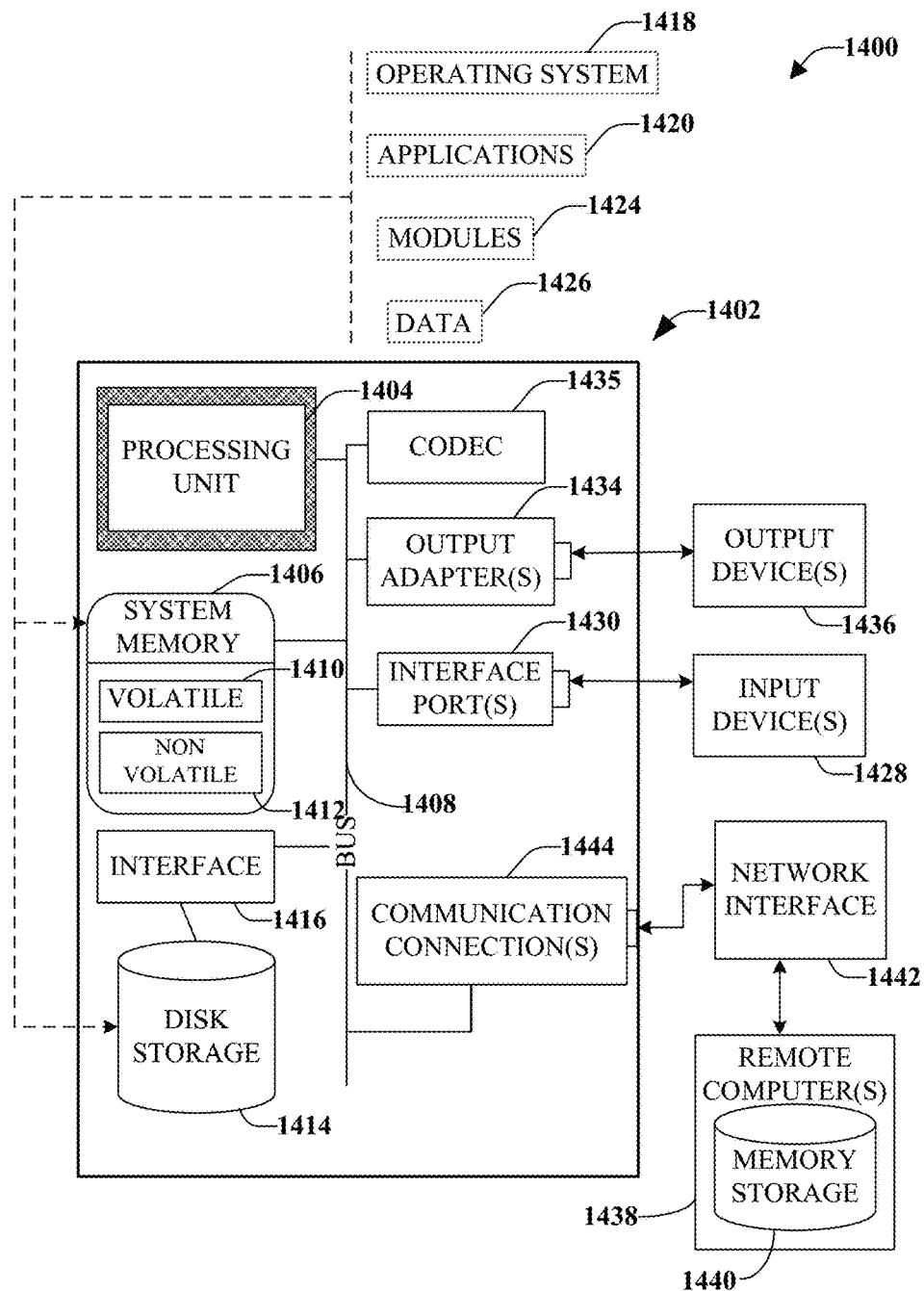
FIG. 14 illustrates an example schematic block diagram for a computing environment in accordance with certain embodiments of this disclosure.

With reference to FIG. 14, a suitable environment 1400 for implementing various aspects of the claimed subject matter includes a computer 1402. The computer 1402 includes a processing unit 1404, a system memory 1406, a codec 1435, and a system bus 1408. The system bus 1408 couples system components including, but not limited to, the system memory 1406 to the processing unit 1404. The processing unit 1404 can be any of various available processors. Dual microprocessors and other multiprocessor architectures also can be employed as the processing unit 1404.

The system bus 1408 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1406 includes volatile memory 1410 and non-volatile memory 1412. The basic input/output system (BIOS), containing the basic routines to transfer information between elements within the computer 1402, such as during start-up, is stored in non-volatile memory 1412. In addition, according to present innovations, codec 1435 may include at least one of an encoder or decoder, wherein the at least one of an encoder or decoder may consist of hardware, software, or a combination of hardware and software. Although, codec 1435 is depicted as a separate component, codec 1435 may be contained within non-volatile memory 1412. By way of illustration, and not limitation, non-volatile memory 1412 can include read only memory (ROM), programmable ROM (PROM), electrically programmable ROM (EPROM), electrically erasable programmable ROM (EEPROM), or flash memory. Volatile memory 1410 includes random access memory (RAM), which acts as external cache memory. According to present aspects, the volatile memory may store the write operation retry logic (not shown in FIG. 14) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1402 may also include removable/non-removable, volatile/non-volatile computer storage medium. FIG. 14 illustrates, for example, disk storage 1414. Disk storage 1414 includes, but is not limited to, devices like a magnetic disk drive, solid state disk (SSD) floppy disk drive, tape drive, Jaz drive, Zip drive, LS-100 drive, flash memory card, or memory stick. In addition, disk storage 1414 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1414 to the system bus 1408, a removable or non-removable interface is typically used, such as interface 1416. It is appreciated that storage devices 1414 can store information related to a user. Such information might be stored at or provided to a server or to an application running on a user device. In one embodiment, the user can be notified (e.g., by way of output device(s) 1436) of the types of information that are stored to disk storage 1414 and/or transmitted to the server or application. The user can be provided the opportunity to control having such information collected and/or shared with the server or application (e.g., by way of input from input device(s) 1428).

It is to be appreciated that FIG. 14 describes software that acts as an intermediary between users and the basic computer resources described in the suitable operating environment 1400. Such software includes an operating system 1418. Operating system 1418, which can be stored on disk storage 1414, acts to control and allocate resources of the computer system 1402. Applications 1420 take advantage of the management of resources by operating system 1418 through program modules 1424, and program data 1426, such as the boot/shutdown transaction table and the like, stored either in system memory 1406 or on disk storage 1414. It is to be appreciated that the claimed subject matter can be implemented with various operating systems or combinations of operating systems.

A user enters commands or information into the computer 1402 through input device(s) 1428. Input devices 1428 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1404 through the system bus 1408 via interface port(s) 1430. Interface port(s) 1430 include, for example, a serial port, a parallel port, a game port, and a universal serial bus (USB). Output device(s) 1436 use some of the same type of ports as input device(s) 1428. Thus, for example, a USB port may be used to provide input to computer 1402 and to output information from computer 1402 to an output device 1436. Output adapter 1434 is provided to illustrate that there are some output devices 1436 like monitors, speakers, and printers, among other output devices 1436, which require special adapters. The output adapters 1434 include, by way of illustration and not limitation, video and sound cards that provide a means of connection between the output device 1436 and the system bus 1408. It should be noted that other devices and/or systems of devices provide both input and output capabilities such as remote computer(s) 1438.

Computer 1402 can operate in a networked environment using logical connections to one or more remote computers, such as remote computer(s) 1438. The remote computer(s)

1438 can be a personal computer, a server, a router, a network PC, a workstation, a microprocessor based appliance, a peer device, a smart phone, a tablet, or other network node, and typically includes many of the elements described relative to computer 1402. For purposes of brevity, only a memory storage device 1440 is illustrated with remote computer(s) 1438. Remote computer(s) 1438 is logically connected to computer 1402 through a network interface 1442 and then connected via communication connection(s) 1444. Network interface 1442 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1444 refers to the hardware/software employed to connect the network interface 1442 to the bus 1408. While communication connection 1444 is shown for illustrative clarity inside computer 1402, it can also be external to computer 1402. The hardware/software necessary for connection to the network interface 1442 includes, for exemplary purposes only, internal and external technologies such as, modems including regular telephone grade modems, cable modems and DSL modems, ISDN adapters, and wired and wireless Ethernet cards, hubs, and routers.

Figure 15:
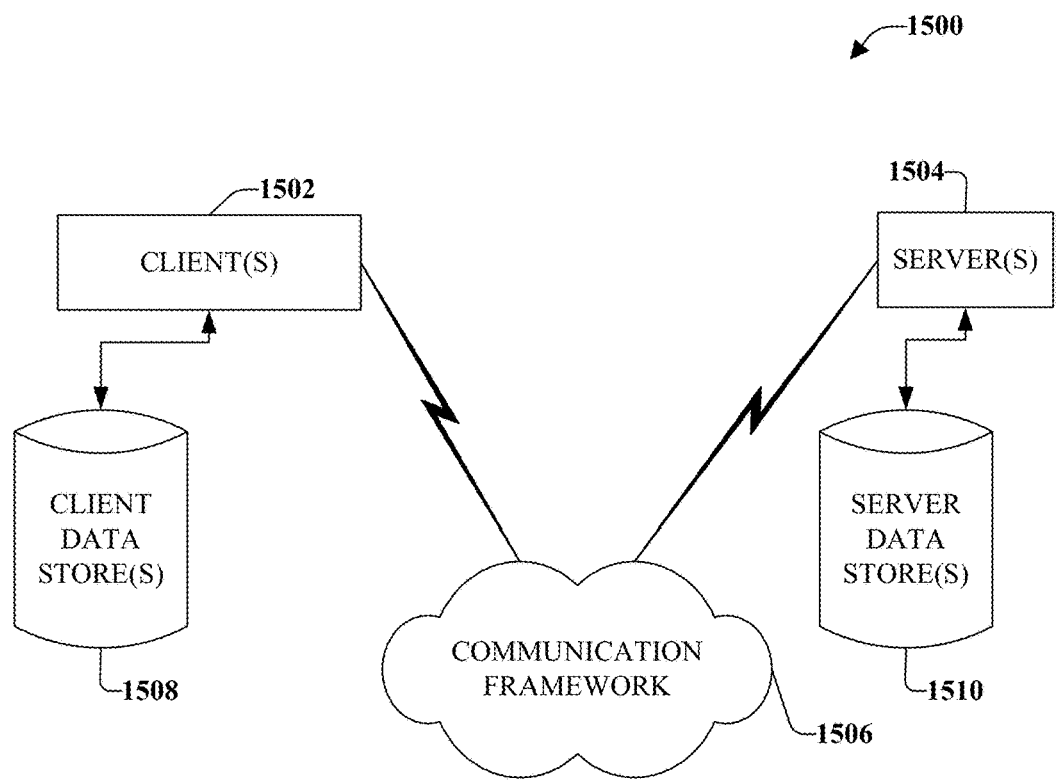
FIG. 15 illustrates an example block diagram of a computer network operable to execute certain embodiments of this disclosure.

Referring now to FIG. 15, there is illustrated a schematic block diagram of a computing environment 1500 in accordance with this specification. The system 1500 includes one or more client(s) 1502 (e.g., laptops, smart phones, PDAs, media players, computers, portable electronic devices, tablets, and the like). The client(s) 1502 can be hardware and/or software (e.g., threads, processes, computing devices). The system 1500 also includes one or more server(s) 1504. The server(s) 1504 can also be hardware or hardware in combination with software (e.g., threads, processes, computing devices). The servers 1504 can house threads to perform transformations by employing aspects of this disclosure, for example. One possible communication between a client 1502 and a server 1504 can be in the form of a data packet transmitted between two or more computer processes wherein the data packet may include video data. The data packet can include a cookie and/or associated contextual information, for example. The system 1500 includes a communication framework 1506 (e.g., a global communication network such as the Internet, or mobile network(s)) that can be employed to facilitate communications between the client(s) 1502 and the server(s) 1504.

Communications can be facilitated via a wired (including optical fiber) and/or wireless technology. The client(s) 1502 are operatively connected to one or more client data store(s) 1508 that can be employed to store information local to the client(s) 1502 (e.g., cookie(s) and/or associated contextual information). Similarly, the server(s) 1504 are operatively connected to one or more server data store(s) 1510 that can be employed to store information local to the servers 1504.

In one embodiment, a client 1502 can transfer an encoded file, in accordance with the disclosed subject matter, to server 1504. Server 1504 can store the file, decode the file, or transmit the file to another client 1502. It is to be appreciated, that a client 1502 can also transfer uncompressed file to a server 1504 and server 1504 can compress the file in accordance with the disclosed subject matter. Likewise, server 1504 can encode video information and transmit the information via communication framework 1506 to one or more clients 1502.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present disclosure. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. Moreover, use of the term "an embodiment" or "one embodiment" throughout is not intended to mean the same embodiment unless specifically described as such.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What is claimed is:

1. A system, comprising:
a memory that stores computer executable components;
a processor that executes at least the following computer executable components stored in the memory:
  a matching component configured to:
    match a first media item with a first set of media items, each of the first set of the media items partially matching the first media item, wherein the matching component generates a first compact digital descriptor by identifying unique characteristics of a spectrogram associated with the first media item and determines the first set of media items by selecting one or more other media items that have corresponding compact digital descriptors that match the first compact digital descriptor, wherein the corresponding compact digital descriptors represent unique characteristics of spectrograms associated with respective ones of the one or more other media items; and
    match a second media item with a second set of media items, each of the second set of the media items partially matching the second media item, wherein the matching component generates a second compact digital descriptor by identifying unique characteristics of a spectrogram associated with the second media item and determines the second set of media items by selecting one or more other media items that have corresponding compact digital descriptors that match the second compact digital descriptor, wherein the corresponding compact digital descriptors represent unique characteristics of spectrograms associated with respective ones of the one or more other media items;
  a representation component configured to:
    select a first set of candidate representative media items from the first set of media items, each of the first set of candidate representative media items meeting a match threshold defining a level of similarity with the first media item; and select a second set of candidate representative media items from the second set of media items, each of the second set of candidate representative media items meeting the match threshold defining a level of similarity with the second media item; and a query component configured to:
receive a query that references the first reference media item and the second reference media item from an external device identify a representative media item for the first media item and the second media item based on determining the representative media item is included in the first set of candidate representative media items and the second set of candidate representative media items; and substitute the first media item and the second media item with the representative media item in a query result that is responsive to the query; and transmit the query result to the external device, the query result providing access to the representative media item.

2. The system of claim 1, wherein the representation component is further configured to:
select a first subset of candidate representative media items from the first set of candidate representative media items that meet the match threshold in comparison with the first media item; and
select a second subset of candidate representative media items from the first set of candidate representative media items that meet a different match threshold in comparison with the first media item.

3. The system of claim 1, wherein the representation component is further configured to pseudo randomly select media items from the first set of media items that meet the match threshold in comparison with the first media item for the first set of candidate representative media items.

4. The system of claim 1, wherein the matching component is further configured to match monotonically increasing segments of the first media item with monotonically increasing segments of the first set of media items.

5. The system of claim 4, wherein the matching component is further configured to identify a longest matching segment associated with the first media item and each of the first set of candidate representative media items, and wherein
the query component is further configured to identify the representative media item based on comparison of the longest matching segment selected from the first set of candidate representative media items and a longest matching segment selected from the second set of candidate representative media items.

6. The system of claim 1, wherein the query component is further configured to identify the representative media item based on comparing matching segments of media items comprised in the first set of candidate representative media items and segments of media items comprised in the second set of candidate representative media items.

7. The system of claim 1, wherein the representation component is further configured to select a media item for the first set of candidate representative media items based on a length of matching segments of the media item meeting a duration threshold length, the matching segments representing segments of the selected media item that match segments of the first media item.

8. The system of claim 1, further comprising a presentation component configured to initiate, in response to the query component identifying the representative media item, a rendering of the representative media item.

9. The system of claim 1, wherein the query component is further configured to identify the representative media in response to receiving data describing a query request.

10. The system of claim 9, wherein the data describing the query request is based on at least one event selected from a group of events comprising: receiving input, from a user device, representing a search string; or receiving input identifying a media item selected for rendering.

11. The system of claim 1, wherein the representation component is further configured to:
determine hash values of representations of each of the first set of candidate representative media items; and
select, based on the hash values, the determined number of the candidate representative media items as the first set of candidate representative media items.

12. A method comprising:
using a processor to execute the following computer executable instructions stored in a memory to perform the following acts:
generating a first compact digital descriptor by identifying unique characteristics of a spectrogram associated with a first reference media item;
determining a first set of media items by selecting one or more media items that have corresponding compact digital descriptors that match the first compact digital descriptor, wherein the corresponding compact digital descriptors represent unique characteristics of spectrograms associated with respective ones of the one or more media items;
generating a second compact digital descriptor by identifying unique characteristics of a spectrogram associated with a second reference media item;
determining a second set of media items by selecting one or more media items that have corresponding compact digital descriptors that match the second compact digital descriptor, wherein the corresponding compact digital descriptors represent unique characteristics of spectrograms associated with respective ones of the one or more media items;
selecting a first set of candidate media items from the first set of media items, each of the first set of candidate media items meeting a threshold measure of similarity with a first reference media item;
selecting a second set of candidate media items from the second set of media items, each of the second set of candidate media items meeting the threshold measure of similarity with a second reference media item;
receiving a query that references the first reference media item and the second reference media item from an external device;
identifying a representative media item that is included in the first set of candidate media items and the second set of candidate media items;
substituting the first reference media item and the second reference media item with the representative reference media item in a query result that is responsive to the query; and
transmitting the query result to the external device, the query result providing access to the representative media item.

13. The method of claim 12, wherein selecting the first set of candidate media items further comprises determining that respective sequential and non-overlapping segments of a candidate media item match sequential and non-overlapping segments of the first reference media item.

14. The method of claim 12, the acts further comprising:
selecting the representative media item from potential representative media items that are included in the first set of candidate media items and the second set of candidate media items, based in part on at least one of the measure of similarity, a measure of quality, a popularity metric, or a user identity associated with the representative media item.

15. The method of claim 12, wherein determining the measure of similarity further comprises determining a sum of lengths of matching segments between the candidate media item and the first reference media item.

16. The method of claim 15, the acts further comprising:
determining the measure of similarity meets the similarity threshold, based on the sum of lengths of matching segments and a total length of the first reference media item.

17. A non-transitory computer readable storage medium comprising computer-executable instructions, that in response to execution, cause a computing system to perform operations, comprising:
generating a first compact digital descriptor by identifying unique characteristics of a spectrogram associated with a first reference media item;
determining a first set of media items by selecting one or more media items that have corresponding compact digital descriptors that match the first compact digital descriptor, wherein the corresponding compact digital descriptors represent unique characteristics of spectrograms associated with respective ones of the one or more media items;
generating a second compact digital descriptor by identifying unique characteristics of a spectrogram associated with a second reference media item;
determining a second set of media items by selecting one or more media items that have corresponding compact digital descriptors that match the second compact digital descriptor, wherein the corresponding compact digital descriptors represent unique characteristics of spectrograms associated with respective ones of the one or more media items;
selecting a first set of candidate media items from the first set of media items that meet a threshold similarity in comparison with a first reference media item;
selecting a second set of candidate media items from the second set of media items that meet the threshold similarity in comparison with a second reference media item;
receiving a query that references the first reference media item and the second reference media item from an external device;
determining whether a representative media item is a member of the first set of candidate media items and the second set of candidate media items; and
in response to determining the representative media item is a member of the first set of candidate media items and the second set of candidate media items:
substituting the representative media item for the first reference media item and the second reference media item in a query result that is responsive to the query; and
transmitting the query result to the external device, the query result providing access to the representative media item.

18. The non-transitory computer readable storage medium of claim 17, wherein the operations further comprises:
in response to determining that a new media item matches the first reference media item, generating an update set of first candidate media items.

19. The non-transitory computer readable storage medium of claim 17, wherein the operations further comprises:
in response to determining a plurality of media items is included in the first set of candidate media items and the second set of candidate media items, selecting the representative media based on a measure of similarity between the representative media item and the first reference media item, and a measure of similarity between the representative media item the second reference media item.

20. The non-transitory computer readable storage medium of claim 17, wherein the operations further comprises:
initiating a rendering of the representative media item; and
initiating a rendering of a set of media items that are related to the representative media item.

* * * * *